(12) United States Patent
Winer

(10) Patent No.: US 11,243,679 B2
(45) Date of Patent: Feb. 8, 2022

(54) REMOTE DATA INPUT FRAMEWORK

(71) Applicant: Apple Inc., Cupertino, CA (US)

(72) Inventor: Morgan H. Winer, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/389,617

(22) Filed: Apr. 19, 2019

(65) Prior Publication Data

US 2019/0369827 A1 Dec. 5, 2019

Related U.S. Application Data

(60) Provisional application No. 62/679,830, filed on Jun. 3, 2018.

(51) Int. Cl.
*G06F 3/0487* (2013.01)

(52) U.S. Cl.
CPC .................................. *G06F 3/0487* (2013.01)

(58) Field of Classification Search
CPC .............................. G06F 3/0487; G06F 3/0233
See application file for complete search history.

(56) References Cited

U.S. PATENT DOCUMENTS

| | | | |
|---|---|---|---|
| 5,831,664 A * | 11/1998 | Wharton | H04N 7/163 725/81 |
| 7,650,445 B2 | 1/2010 | Ma et al. | |
| 9,300,720 B1 * | 3/2016 | Qiu | H04L 67/08 |
| 9,357,250 B1 * | 5/2016 | Newman | H04N 21/4104 |
| 9,672,212 B1 | 6/2017 | Vegulla et al. | |
| 10,042,599 B2 * | 8/2018 | Clarke | G06F 3/033 |
| 10,108,612 B2 * | 10/2018 | Lee | G06F 3/0482 |
| 10,382,927 B2 * | 8/2019 | Kandregula | H04W 4/80 |
| 2008/0120448 A1 | 5/2008 | Shi et al. | |
| 2010/0011299 A1 * | 1/2010 | Brodersen | H04L 67/36 715/740 |
| 2011/0084919 A1 * | 4/2011 | Lee | G06F 3/023 345/173 |
| 2011/0113088 A1 * | 5/2011 | Seo | G06F 9/542 709/203 |
| 2013/0024777 A1 * | 1/2013 | Brakensiek | G08C 19/28 715/740 |
| 2013/0027404 A1 * | 1/2013 | Sarnoff | G09G 5/14 345/441 |
| 2013/0103797 A1 * | 4/2013 | Park | H04L 65/60 709/217 |
| 2013/0138728 A1 * | 5/2013 | Kim | G06F 15/16 709/203 |

(Continued)

*Primary Examiner* — Tadesse Hailu
(74) *Attorney, Agent, or Firm* — Morgan, Lewis & Bockius LLP

(57) ABSTRACT

Embodiments described herein provide a framework to enable a remote data input from a host device to a remote device. One embodiment provides an electronic device comprising a non-transitory machine-readable medium to store instructions, one or more processors to execute the instructions, and a memory coupled to the one or more processors. The memory can store instructions which, when executed by the one or more processors, cause the one or more processors to translate the physical input signal from the input sensor into a character, generate an insertion text event associated with the character, and transmit the insertion text event from the electronic device to a remote device.

20 Claims, 14 Drawing Sheets

(56) References Cited

U.S. PATENT DOCUMENTS

| | | | |
|---|---|---|---|
| 2013/0151989 A1* | 6/2013 | Dent | G06F 16/20 |
| | | | 715/753 |
| 2013/0291015 A1* | 10/2013 | Pan | H04N 5/4403 |
| | | | 725/37 |
| 2013/0318468 A1* | 11/2013 | Lee | G06F 3/04886 |
| | | | 715/780 |
| 2013/0321268 A1* | 12/2013 | Tuck | G06F 3/011 |
| | | | 345/157 |
| 2014/0320398 A1* | 10/2014 | Papstein | H04M 1/72436 |
| | | | 345/156 |
| 2015/0067486 A1* | 3/2015 | Hochman | G06F 40/166 |
| | | | 715/257 |
| 2016/0196205 A1 | 7/2016 | Buszynski et al. | |
| 2016/0259536 A1* | 9/2016 | Kudurshian | G06F 3/016 |
| 2016/0349946 A1* | 12/2016 | Koh | G06F 3/0488 |
| 2016/0350060 A1* | 12/2016 | Park | H04W 4/029 |
| 2017/0075641 A1* | 3/2017 | Kwon | G06F 3/0227 |
| 2017/0244257 A1* | 8/2017 | Sung | H02J 7/0014 |
| 2017/0277498 A1* | 9/2017 | Wood, Jr. | G06F 3/033 |
| 2018/0329560 A1* | 11/2018 | Kim | G06F 21/6218 |

* cited by examiner

REMOTE DATA INPUT FRAMEWORK

CROSS-REFERENCE

This application claims priority of U.S. Provisional Patent Application No. 62/679,830, having the title "Remote Data Input Framework," to Morgan H. Winer, filed Jun. 3, 2018, which is incorporated by reference in its entirety to the extent that it is consistent with this disclosure.

TECHNICAL FIELD

This disclosure relates generally to electronic devices. More specifically, this disclosure relates to a system and associated methods for remote data input for electronic devices.

BACKGROUND

Electronic devices (e.g., computers, tables, mobile phones, televisions, etc.) are increasingly mobile and increasingly connected and/or synchronized. Further, users may interact with multiple electronic devices contemporaneously. For example, a mobile phone, tablet, or laptop computer may be used to search or browse a media streaming service presented on a television using a mobile phone and a table device. Alternatively, two or more separate users may wish to search or browse a media streaming service from their respective devices. Accordingly, techniques to manage remote data input in electronic devices may find utility, e.g., in processing inputs among connected devices.

SUMMARY

Embodiments described herein provide techniques to manage remote data input for electronic devices. In some embodiments, techniques described herein enable direct communication between the protocol stacks for input devices (e.g., keyboards, touch screens, touch pads, etc.) of electronic devices such that data (e.g., characters) input to the input device of a first electronic device is communicated to the protocol stack for an input device on a second electronic device.

One embodiment provides an electronic device comprising a communication interface to establish a communication connection with a remote device, a non-transitory machine-readable medium to store instructions, one or more processors to execute the instructions, a memory coupled to the one or more processors, the memory to store instructions read from the non-transitory machine-readable medium. The instructions, when executed by the one or more processors, cause the one or more processors to receive state information relating to a text field on the remote device via the communication interface, receive, in an input/output subsystem, a physical input signal from an input sensor, translate the physical input signal from the input sensor into a character, the input signal translated at least in part based on the state information related to the text field, generate an insertion text event associated with the character, the insertion text event associated with an event system of the remote device, and transmit the insertion text event from the electronic device to the remote device.

One embodiment provides for a non-transitory machine-readable medium storing instructions which, when executed by one or more processors of an electronic device, configure the one or more processors to receive state information relating to a text field on a remote device via a communication interface of the electronic device, receive, via an input/output subsystem, a physical input signal from an input sensor, translate the physical input signal from the input sensor into a character, generate an insertion text event associated with the character, the insertion text event associated with an event system of the remote device, and transmit the insertion text event from the electronic device to the remote device.

One embodiment provides for an electronic device, comprising a non-transitory machine-readable medium to store instructions, one or more processors to execute the instructions, and a memory coupled to the one or more processors. The memory stores instructions which, when executed by the one or more processors, cause the one or more processors to activate a text field on an input device, detect a host device having support for a remote input service, gather state information associated with the text field, transmit the state information to the host device, receive an input operation from the host device, and apply the input operation to the text field.

One embodiment provides for a non-transitory machine-readable medium storing instructions which, when executed by one or more processors of an electronic device, configure the one or more processors to activate a text field on an input device, detect a host device having support for a remote input service, gather state information associated with the text field, transmit the state information to the host device, receive an input operation from the host device, and apply the input operation to the text field.

Other features of the present embodiments will be apparent from the accompanying drawings and from the detailed description, which follows.

BRIEF DESCRIPTION OF THE DRAWINGS

Embodiments of the disclosure are illustrated by way of example, and not by way of limitation, in the figures of the accompanying drawings in which like reference numerals refer to similar elements.

DETAILED DESCRIPTION

Figure 1A:
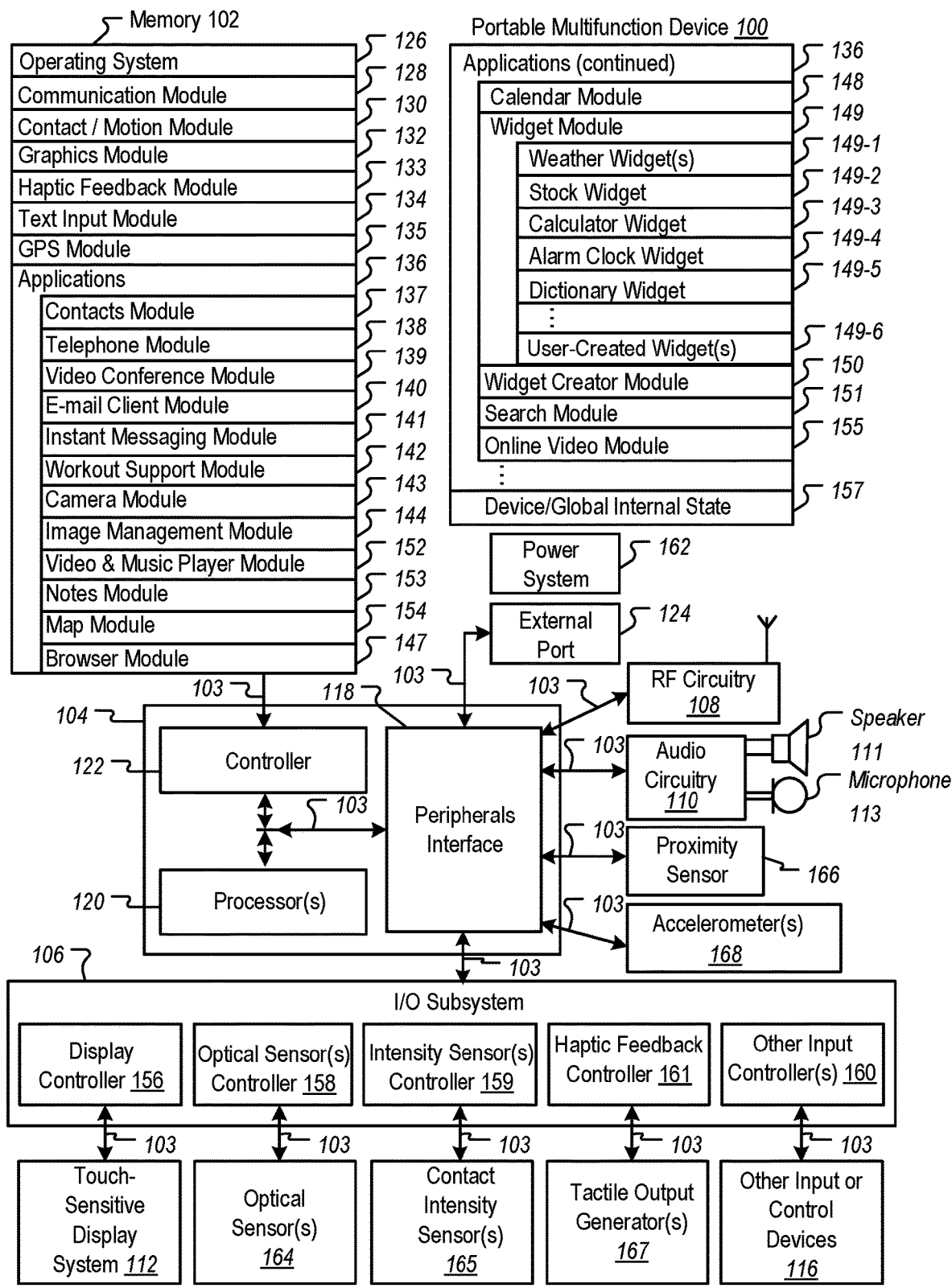
FIG. 1A-1B are schematic illustrations of an electronic device architecture in which remote data input can be implemented, according to an embodiment.

Embodiments described herein provide techniques to manage remote data input for electronic devices. A remote text input framework is provided that can be used to share text input between a mobile, laptop, and television or television set-top box operating system. Multiple keyboard frameworks can also communicate to enable a virtual remote keyboard for a multi-process application executing on a host platform. The remote text input framework provides for protocol for two keyboard or more stacks to communicate directly with each other over a transport agnostic communication channel including Ethernet, Bluetooth, Wi-Fi, or other communication channels. The protocol enables the keyboards to understand the underlying context seen by another keyboard and make input suggestions appropriately. In one embodiment the keyboard protocol enables multiple keyboards on different devices to attempt to fill in the same field at the same time. For example, two or more mobile devices can attempt to fill in the same field presented on a television or television set top box UI.

The remote text input framework described herein can also be used to enable data input to a host platform to be relayed to a hosted mobile application executing on a host platform. A host keyboard of the host platform can provide remote input to a content process of a multi-process, multi-platform application, which the application will receive as though the input data was provided by a remote keyboard coupled with a virtualized, emulated, or hosted remote platform in which the content process is designed to operate.

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" or "some embodiments" means that a particular feature, structure, or characteristic described in conjunction with the embodiment can be included in at least one embodiment. The appearances of the phrase "embodiment" in various places in the specification do not necessarily all refer to the same embodiment.

It should be noted that there can be variations to the flow diagrams or the steps (or operations) described therein without departing from the embodiments described herein. For instance, the steps can be performed in parallel, simultaneously, a differing order, or steps can be added, deleted, or modified.

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of computing devices, user interfaces for such devices, and associated processes for using such devices are described. In some embodiments, the computing device is a portable communications device such as a mobile telephone that also contains other functions, such as PDA and/or music player functions. Exemplary embodiments of portable multifunction devices include, without limitation, the iPhone®, iPad®, and iPod touch® devices from Apple Computer, Inc. of Cupertino, Calif. The portable multifunction devices can operate in conjunction with a television or television set top box. For example, the portable multifunction devices can enable remote text input for In the discussion that follows, a computing device that includes a touch-sensitive display is described. It should be understood, however, that the computing device may include one or more other physical user-interface devices, such as a separate display, physical keyboard, a mouse, and/or a joystick.

The device supports a variety of applications, such as one or more of the following: a note taking application, a drawing application, a presentation application, a word processing application, a website creation application, a disk authoring application, a spreadsheet application, a gaming application, a telephone application, a video-conferencing application, an e-mail application, an instant messaging application, a fitness application, a photo management application, a digital camera application, a digital video camera application, a web browsing application, a digital music player application, a digital video player application, and/or a home automation application.

The various applications that can be executed on the device can use at least one common physical user-interface device, such as the touch-sensitive surface. One or more functions of the touch-sensitive surface as well as corresponding information displayed on the device can be adjusted and/or varied from one application to the next and/or within a respective application. In this way, a common physical architecture (such as the touch-sensitive surface) of the device can support the variety of applications with user interfaces that are intuitive and transparent.

The user interfaces can include one or more soft keyboard embodiments. The soft keyboard embodiments can include standard (QWERTY) and/or non-standard configurations of symbols on the displayed icons of the keyboard, such as those described in U.S. patent application Ser. No. 11/459,606, "Keyboards for Portable Electronic Devices," filed Jul. 24, 2006, and Ser. No. 11/459,615, "Touch Screen Keyboards for Portable Electronic Devices," filed Jul. 24, 2006, the contents of which are hereby incorporated by reference in their entirety to the extent that they are consistent with this disclosure. The keyboard embodiments can include a reduced number of icons (or soft keys) relative to the number of keys in existing physical keyboards, such as that for a typewriter. This can make it easier for users to select one or more icons in the keyboard, and thus, one or more corresponding symbols. The keyboard embodiments can be adaptive. For example, displayed icons can be modified in accordance with user actions, such as selecting one or more icons and/or one or more corresponding symbols. Additionally, keyboard embodiments can also include a word prediction module that can predict subsequent user input and provide suggestions to the user including predicted input. One or more applications on the device can utilize common and/or different keyboard embodiments. Thus, the keyboard embodiment used can be tailored to at least some of the applications. In some embodiments, one or more keyboard embodiments can be tailored to a respective user. For example, one or more keyboard embodiments can be tailored to a respective user based on a word usage history (lexicography, slang, individual usage) of the respective user. Some of the keyboard embodiments can be adjusted to reduce a probability of a user error when selecting one or more icons, and thus one or more symbols, when using the soft keyboard embodiments.

FIG. 1A is a block diagram illustrating portable multifunction device 100 with touch-sensitive display system 112 in accordance with some embodiments. Touch-sensitive display system 112 is sometimes called a "touch screen" for convenience and is sometimes simply called a touch-sensitive display. Device 100 includes memory 102 (which optionally includes one or more computer readable storage mediums), memory controller 122, one or more processing units (e.g., CPUs) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100). These components optionally communicate over one or more communication buses or signal lines 103.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, firmware, or a combination thereof, including one or more signal processing and/or application specific integrated circuits.

Memory 102 optionally includes high-speed random-access memory and optionally also includes non-volatile memory, such as one or more magnetic disk storage devices, flash memory devices, or other non-volatile solid-state memory devices. Access to memory 102 by other components of device 100, such as CPU(s) 120 and the peripherals interface 118, is, optionally, controlled by memory controller 122.

Peripherals interface 118 can be used to couple input and output peripherals of the device to CPU(s) 120 and memory 102. The one or more CPU(s) 120 run or execute various software programs and/or sets of instructions stored in memory 102 to perform various functions for device 100 and to process data.

In some embodiments, peripherals interface 118, CPU(s) 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication optionally uses any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11ac, IEEE 802.11ax, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack. The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch-sensitive display system 112 and other input or control devices 116, with peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input or control devices 116. The other input or control devices 116 optionally include physical buttons (e.g., push buttons, rocker buttons, etc.), dials, slider switches, joysticks, click wheels, and so forth. In some alternate embodiments, input controllers 160 are, optionally, coupled with any (or none) of the following: a keyboard, infrared port, USB port, stylus, and/or a pointer device such as a mouse. The one or more buttons (e.g., 208, FIG. 2A) optionally include an up/down button for volume control of speaker 111 and/or microphone 113. The one or more buttons optionally include a push button.

Touch-sensitive display system 112 provides an input interface and an output interface between the device and a user. Display controller 156 receives and/or sends electrical signals from/to touch-sensitive display system 112. Touch-sensitive display system 112 displays visual output to the user. The visual output optionally includes graphics, text, icons, video, and any combination thereof (collectively termed "graphics"). In some embodiments, some or all of the visual output corresponds to user-interface objects. As used herein, the term "affordance" refers to a user-interactive graphical user interface object (e.g., a graphical user interface object that is configured to respond to inputs directed toward the graphical user interface object). Examples of user-interactive graphical user interface objects include, without limitation, a button, slider, icon, selectable menu item, switch, hyperlink, or other user interface control.

Touch-sensitive display system 112 has a touch-sensitive surface, sensor or set of sensors that accepts input from the user based on haptic and/or tactile contact. Touch-sensitive display system 112 and display controller 156 (along with any associated modules and/or sets of instructions in memory 102) detect contact (and any movement or breaking of the contact) on touch-sensitive display system 112 and converts the detected contact into interaction with user-interface objects (e.g., one or more soft keys, icons, web pages or images) that are displayed on touch-sensitive display system 112. In an exemplary embodiment, a point of contact between touch-sensitive display system 112 and the user corresponds to a finger of the user or a stylus.

Touch-sensitive display system 112 optionally uses LCD (liquid crystal display) technology, LPD (light emitting polymer display) technology, or LED (light emitting diode) technology, although other display technologies are used in other embodiments. Touch-sensitive display system 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch-sensitive display system 112. In an exemplary embodiment, projected mutual capacitance sensing technology is used, such as that found in the iPhone®, iPod Touch®, and iPad® from Apple Inc. of Cupertino, Calif.

Touch-sensitive display system 112 optionally has a video resolution in excess of 100 dpi. In some embodiments, the touch screen video resolution is in excess of 400 dpi (e.g., 500 dpi, 800 dpi, or greater). The user optionally makes contact with touch-sensitive display system 112 using any suitable object or appendage, such as a stylus, a finger, and so forth. In some embodiments, the user interface is designed to work with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch-sensitive display system 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management, and distribution of power in portable devices.

Device 100 optionally also includes one or more optical sensors 164. FIG. 1A shows an optical sensor coupled with optical sensor controller 158 in I/O subsystem 106. Optical sensors 164 optionally include charge-coupled device (CCD) or complementary metal-oxide semiconductor (CMOS) phototransistors. Optical sensors 164 receive light from the environment, projected through one or more lens, and converts the light to data representing an image. In conjunction with camera module 143 (also called an imagine module), optical sensors 164 optionally capture still images and/or video. In some embodiments, an optical sensor is located on the back of device 100, opposite touch-sensitive display system 112 on the front of the device, so that the touch screen is enabled for use as a viewfinder for still and/or video image acquisition. In some embodiments, another optical sensor is located on the front of the device so that the user's image is obtained (e.g., for selfies, for videoconferencing while the user views the other video conference participants on the touch screen, etc.).

Device 100 optionally also includes one or more contact intensity sensors 165. FIG. 1A shows a contact intensity sensor coupled with intensity sensor controller 159 in I/O subsystem 106. Contact intensity sensors 165 optionally include one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensors 165 receive contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch-screen display system 112 which is located on the front of device 100.

Device 100 optionally also includes one or more proximity sensors 166. FIG. 1A shows proximity sensor 166 coupled with peripherals interface 118. Alternately, proximity sensor 166 is coupled with input controller 160 in I/O subsystem 106. In some embodiments, the proximity sensor turns off and disables touch-sensitive display system 112 when the multifunction device is placed near the user's ear (e.g., when the user is making a phone call).

Device 100 optionally also includes one or more tactile output generators 167. FIG. 1A shows a tactile output generator coupled with haptic feedback controller 161 in I/O subsystem 106. Tactile output generators 167 optionally include one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Tactile output generators 167 receive tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch-sensitive display system 112, which is located on the front of device 100.

Device 100 optionally also includes one or more accelerometers 168. FIG. 1A shows accelerometer 168 coupled with peripherals interface 118. Alternately, accelerometer 168 is, optionally, coupled with an input controller 160 in I/O subsystem 106. In some embodiments, information is displayed on the touch-screen display in a portrait view or a landscape view based on an analysis of data received from the one or more accelerometers. Device 100 optionally includes, in addition to accelerometers 168, a magnetometer (not shown) and a GPS (or GLONASS or other global navigation system) receiver (not shown) for obtaining information concerning the location and orientation (e.g., portrait or landscape) of device 100.

In some embodiments, the software components stored in memory 102 include operating system 126, communication module 128 (or set of instructions), contact/motion module 130 (or set of instructions), graphics module 132 (or set of instructions), haptic feedback module 133 (or set of instructions), text input module 134 (or set of instructions), Global Positioning System (GPS) module 135 (or set of instructions), and applications 136 (or sets of instructions). Furthermore, in some embodiments, memory 102 stores device/global internal state 157, as shown in FIG. 1A. Device/global internal state 157 includes one or more of: active application state, indicating which applications, if any, are currently active; display state, indicating what applications, views or other information occupy various regions of touch-sensitive display system 112; sensor state, including information obtained from the device's various sensors and other input or control devices 116; and location and/or positional information concerning the device's location and/or attitude.

Operating system 126 (e.g., iOS, Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used in some iPhone®, iPod Touch®, and iPad® devices from Apple Inc. of Cupertino, Calif. In some embodiments, the external port is a Lightning connector that is the same as, or similar to and/or compatible with the Lightning connector used in some iPhone®, iPod Touch®, and iPad® devices from Apple Inc. of Cupertino, Calif.

Contact/motion module 130 optionally detects contact with touch-sensitive display system 112 (in conjunction with display controller 156) and other touch-sensitive devices (e.g., a touchpad or physical click wheel). Contact/motion module 130 includes various software components for performing various operations related to detection of contact (e.g., by a finger or by a stylus), such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts or stylus contacts) or to multiple simultaneous contacts (e.g., "multitouch"/multiple finger contacts). In some embodiments, contact/motion module 130 and display controller 156 detect contact on a touchpad.

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Similarly, tap, swipe, drag, and other gestures are optionally detected for a stylus by detecting a particular contact pattern for the stylus.

Graphics module 132 includes various known software components for rendering and displaying graphics on touch-sensitive display system 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generators 167 to produce tactile outputs at one or more locations on device 100 in response to user interactions with device 100.

Text input module 134, which is, optionally, a component of graphics module 132, provides soft keyboards for entering text in various applications (e.g., contacts module 137, e-mail client module 140, instant messaging module 141, browser module 147, and any other application that needs text input).

GPS module 135 determines the location of the device and provides this information for use in various applications (e.g., to telephone module 138 for use in location-based dialing, to camera module 143 as picture/video metadata, and to applications that provide location-based services such as weather widgets, local yellow page widgets, and map/navigation widgets).

Applications 136 optionally include the following modules (or sets of instructions), or a subset or superset thereof: contacts module 137 (sometimes called an address book or contact list); telephone module 138; video conferencing module 139; e-mail client module 140; instant messaging (IM) module 141; workout support module 142; camera module 143 for still and/or video images; image management module 144; browser module 147; calendar module 148; widget modules 149, which optionally include one or more of weather widget 149-1, stocks widget 149-2, calculator widget 149-3, alarm clock widget 149-4, dictionary widget 149-5, and other widgets obtained by the user. Applications can also include as user-created widgets 149-6; widget creator module 150 for making user-created widgets 149-6; search module 151; video and music player module 152, which is, optionally, made up of a video player module and a music player module; notes module 153; map module 154; and/or online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch-sensitive display system 112, display controller 156, contact/motion module 130, graphics module 132, and text input module 134, contacts module 137 includes executable instructions to manage an address book or contact list (e.g., stored in application internal state 192 of contacts module 137 in memory 102), including: adding name(s) to the address book; deleting name(s) from the address book; associating telephone number(s), e-mail address(es), physical address(es) or other information with a name; associating an image with a name; categorizing and sorting names; providing telephone numbers and/or e-mail addresses to initiate and/or facilitate communications by telephone, video conference, e-mail, IM; and so forth.

In conjunction with RF circuitry 108, audio circuitry 110, speaker 111, microphone 113, touch-sensitive display system 112, display controller 156, contact/motion module 130, graphics module 132, and text input module 134, telephone module 138 includes executable instructions to enter a sequence of characters corresponding to a telephone number, access one or more telephone numbers in address book (e.g., contacts module 137), modify a telephone number that has been entered, dial a respective telephone number, conduct a conversation and disconnect or hang up when the conversation is completed. As noted above, the wireless communication optionally uses any of a plurality of communications standards, protocols and technologies.

In conjunction with RF circuitry 108, audio circuitry 110, speaker 111, microphone 113, touch-sensitive display system 112, display controller 156, optical sensors 164, optical sensor controller 158, contact/motion module 130, graphics module 132, text input module 134, contact list 137, and telephone module 138, video conferencing module 139 includes executable instructions to initiate, conduct, and terminate a video conference between a user and one or more other participants in accordance with user instructions.

In conjunction with RF circuitry 108, touch-sensitive display system 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch-sensitive display system 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, Apple Push Notification Service (APNs) or IMPS for Internet-based instant messages), to receive instant messages and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, APNs, or IMPS).

In conjunction with RF circuitry 108, touch-sensitive display system 112, display controller 156, contact/motion module 130, graphics module 132, text input module 134, GPS module 135, map module 154, and music player module 146, workout support module 142 includes executable instructions to create workouts (e.g., with time, distance, and/or calorie burning goals); communicate with workout sensors (in sports devices and smart watches); receive workout sensor data; calibrate sensors used to monitor a workout; select and play music for a workout; and display, store and transmit workout data.

In conjunction with touch-sensitive display system 112, display controller 156, optical sensors 164, optical sensor controller 158, contact/motion module 130, graphics module 132, and image management module 144, camera module 143 includes executable instructions to capture still images or video (including a video stream) and store them into memory 102, modify characteristics of a still image or video, and/or delete a still image or video from memory 102.

In conjunction with touch-sensitive display system 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch-sensitive display system 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch-sensitive display system 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch-sensitive display system 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file.

In conjunction with RF circuitry 108, touch-sensitive display system 112, display controller 156, contact/motion module 130, graphics module 132, text input module 134, and browser module 147, the widget creator module 150 includes executable instructions to create widgets (e.g., turning a user-specified portion of a web page into a widget).

In conjunction with touch-sensitive display system 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch-sensitive display system 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch-sensitive display system 112, or on an external display connected wirelessly or via external port 124). In some embodiments, device 100 optionally includes the functionality of a media player.

In conjunction with touch-sensitive display system 112, display controller 156, contact/motion module 130, graphics module 132, and text input module 134, notes module 153 includes executable instructions to create and manage notes, to do lists, and the like in accordance with user instructions.

In conjunction with RF circuitry 108, touch-sensitive display system 112, display controller 156, contact/motion module 130, graphics module 132, text input module 134, GPS module 135, and browser module 147, map module 154 includes executable instructions to receive, display, modify, and store maps and data associated with maps (e.g., driving directions; data on stores and other points of interest at or near a particular location; and other location-based data) in accordance with user instructions.

In conjunction with touch-sensitive display system 112, display controller 156, contact/motion module 130, graphics module 132, audio circuitry 110, speaker 111, RF circuitry 108, text input module 134, e-mail client module 140, and browser module 147, online video module 155 includes executable instructions that allow the user to access, browse, receive (e.g., by streaming and/or download), play back (e.g., on the touch screen 112, or on an external display connected wirelessly or via external port 124), send an e-mail with a link to a particular online video, and otherwise manage online videos in one or more file formats. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules are, optionally, combined or otherwise re-arranged in various embodiments. In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
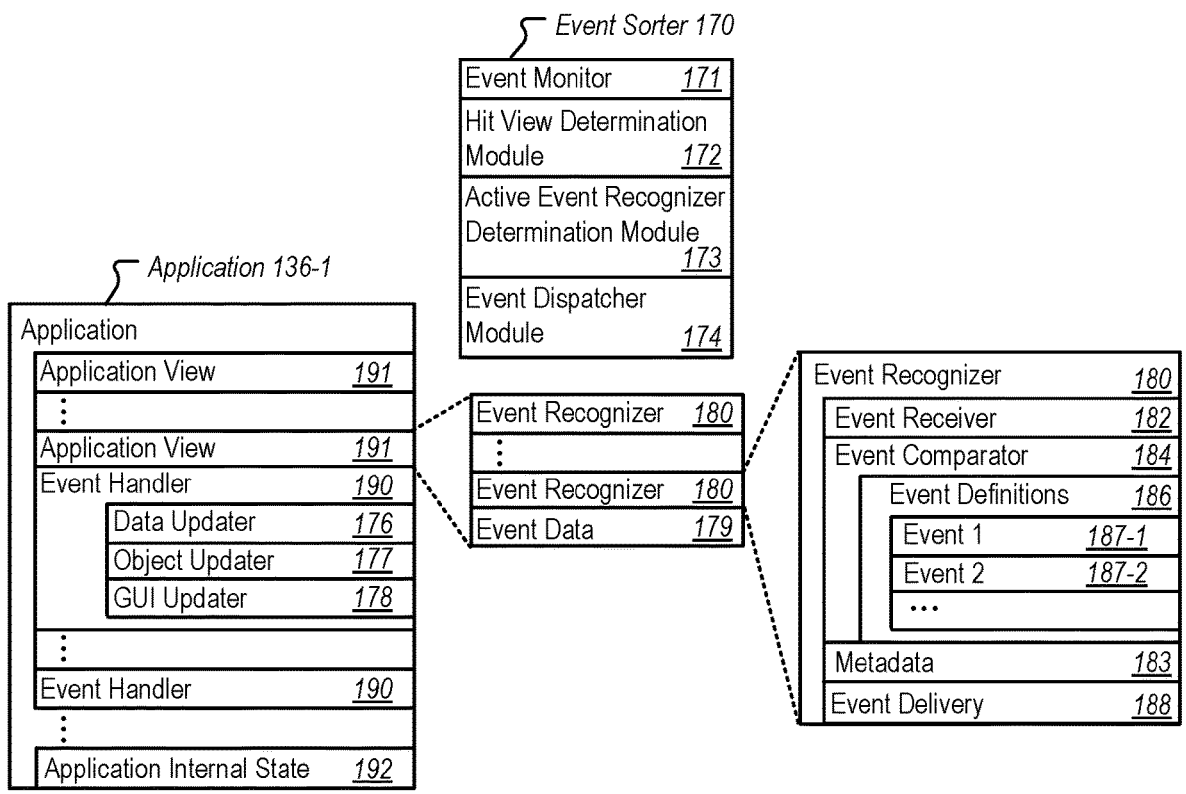

FIG. 1B is a block diagram illustrating exemplary components for event handling in accordance with some embodiments. In some embodiments, memory 102 (in FIG. 1A) includes event sorter 170 (e.g., in operating system 126) and an application 136-1 (e.g., any of the aforementioned applications 137-153).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state stored in the memory 102 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometers 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected can correspond to programmatic levels within a programmatic or view hierarchy of the application. For example, the lowest level view in which a touch is detected can be called the hit view, and the set of events that are recognized as proper inputs can be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by an event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher-level object from which application 136-1 inherits methods and other properties. In some embodiments, a respective event handler 190 includes one or more of: data updater 176, object updater 177, GUI updater 178, and/or event data 179 received from event sorter 170. Event handler 190 can utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

An event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of metadata 183 and event delivery instructions 188 (which can include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information can also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event include, for example, touch begin, touch end, touch movement, touch cancellation, and multiple touching. In one example, the definition for event 1 (187-1) is a double-tap on a displayed object. The double-tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, the event definitions 186 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for an event 187 also includes delayed actions that delay delivery of the event information until after it has been determined whether the sequence of sub-events does or does not correspond to the event recognizer's event type.

When an event recognizer 180 determines that the series of sub-events do not match any of the events in event definitions 186, the event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, an event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers can interact with one another. In some embodiments, metadata 183 includes configurable properties, flags, and/or lists that indicate whether sub-events are delivered to varying levels in the view or programmatic hierarchy.

In some embodiments, an event recognizer 180 activates event handler 190 associated with an event when one or more particular sub-events of an event are recognized. In some embodiments, an event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137 or stores a video file used in video and music player module 145. In some embodiments, object updater 177 creates and updates objects used in application 136-1. For example, data updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of an application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which can be utilized as inputs corresponding to sub-events which define an event to be recognized.

Figure 2:
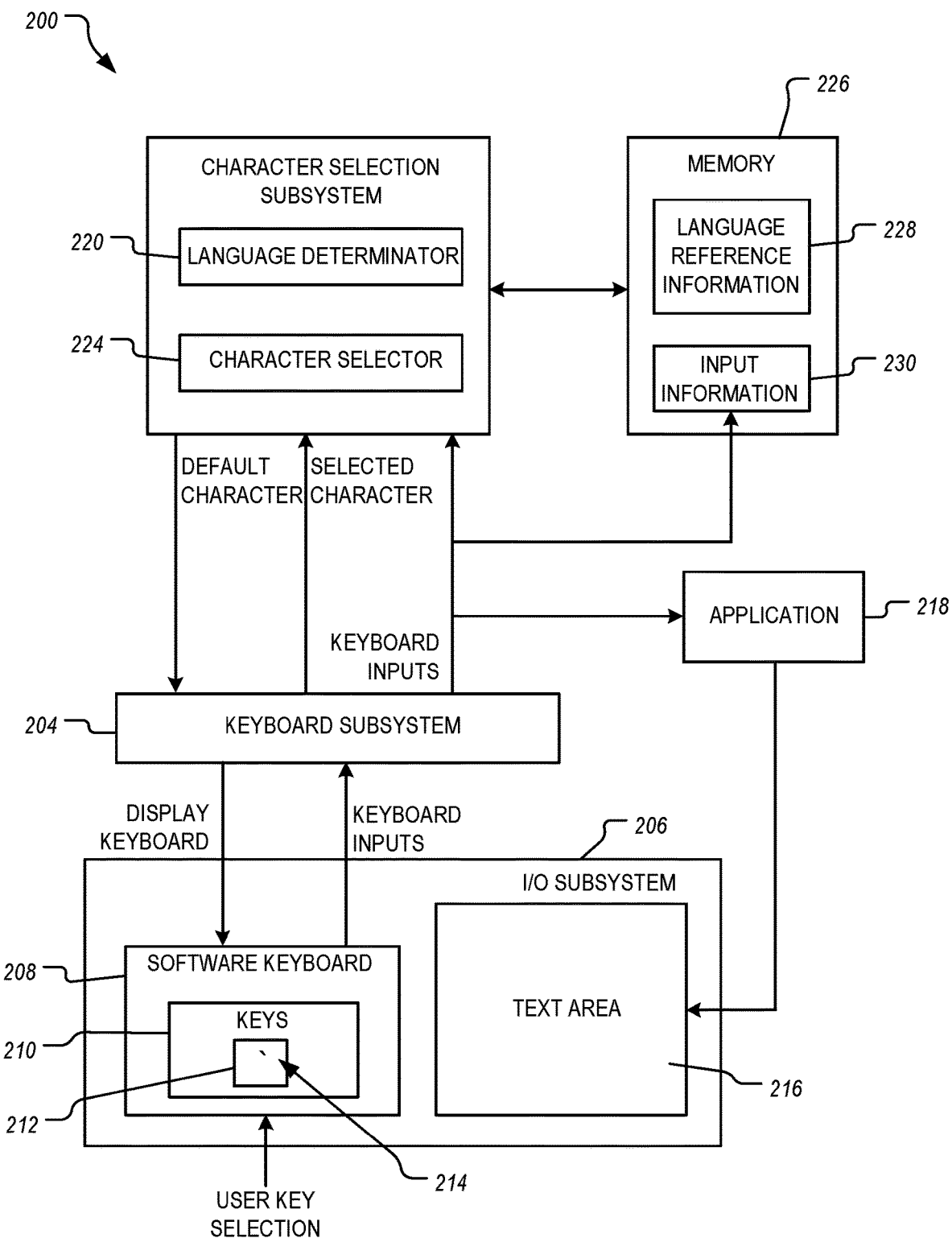
FIG. 2 is a schematic illustration of components of an electronic device in which remote data input can be implemented, according to an embodiment.

FIG. 2 depicts a simplified diagram of a system 200 that can incorporate an embodiment of the present invention. In the embodiment depicted in FIG. 2, system 200 includes multiple subsystems including a character selection subsystem 202, a keyboard subsystem 204, an input/output (I/O)

subsystem 206, and a memory 226. One or more communication paths can be provided enabling one or more of the subsystems to communicate with and exchange data with one another. One or more of the subsystems depicted in FIG. 2 can be implemented in software, in hardware, or combinations thereof. In some embodiments, the software may be stored on a transitory or non-transitory computer readable medium and executed by one or more processors of system 200.

It should be appreciated that system 200 depicted in FIG. 2 can have other components than those depicted in FIG. 2. Further, the embodiment shown in FIG. 2 is only one example of a system that may incorporate an embodiment of the invention. In some other embodiments, system 200 can have more or fewer components than shown in FIG. 2, can combine two or more components, or can have a different configuration or arrangement of components. In some embodiments, system 200 can be part of a portable communications device, such as a mobile telephone, a smart phone, television set top box, or a multifunction device. In some other embodiments, system 200 can also be incorporated in other devices such as desktop computers, kiosks, and the like.

I/O subsystem 206 provides an interface that allows a user to interact with system 200. I/O subsystem 206 can output information to the user. For example, I/O subsystem 206 can include a display device such as a monitor or a screen. I/O subsystem 206 can also enable the user to provide inputs to system 200. In some embodiments, I/O subsystem 206 can include a touch-sensitive interface (also sometimes referred to as a touch screen) that can both display information to a user and also receive inputs from the user. For example, in some embodiments, I/O subsystem 206 can display a software keyboard and enable a user to provide input using the software keyboard such as by selecting a dynamic character key. In some other embodiments, I/O subsystem 206 can include one or more input devices that allow a user to provide inputs to system 200 such as, without limitation, a mouse, a pointer, a keyboard, or other input device.

Memory 226 can be configured to store data and instructions used by some embodiments of the invention. In some embodiments, memory 226 can include volatile memory such as random-access memory or RAM (sometimes referred to as system memory). Instructions or code or programs that are executed by one or more processors of system 200 can be stored in the RAM. Memory 226 can also include non-volatile memory such as one or more storage disks or devices, flash memory, or other non-volatile memory devices.

In some embodiments, character selection subsystem 202 and keyboard subsystem 204, working in cooperation, are responsible for performing processing related to providing a software keyboard with a dynamic character key, where a character associated with dynamic character key is automatically and intelligently deter based upon the context, as discussed in this disclosure. In one embodiment, keyboard subsystem 204 is configured to handle all processing related to displaying a software keyboard 208 and receiving input provided using the software keyboard. In some embodiments, software keyboard 208 can be a language-specific keyboard. Software keyboard 208 rendered by keyboard subsystem 204 can include multiple keys 210 including a dynamic character key 212. A character can be associated with dynamic character key 2112. The character associated with dynamic character key 212 can be displayed on the key. For example, in FIG. 2, a diacritical mark grave accent (') is displayed on dynamic character key 212 indicating that the grave accent (') is currently associated with dynamic character key 212. Other diacritical characters or marks can be associated with a dynamic character key 212, such as those associated with (Ñ), (Ü), and (Ç), or other language specific characters or marks.

Keyboard subsystem 204 is configured to receive inputs corresponding to keys of software keyboard 208 selected by a user. Keyboard subsystem 204 can provide the inputs to character selection subsystem 202. Character selection subsystem 202 can use these inputs to select a character to be associated with dynamic character key 212. In some embodiments, input information 230 can be stored in memory 226. Character selection subsystem 202 can then access the input information 230 from memory 226 as part of its processing for selecting a character to be associated with dynamic character key 212. Keyboard subsystem 204 can also provide the input information to application 218. Application 218 can then display the input information in a text display area 216 associated with application 218 and displayed by I/O subsystem 206.

As described above, in some embodiments, the character that is selected to be associated with the dynamic character key can be a non-alphanumeric character such as a diacritical mark or a punctuation mark. The non-alphanumeric characters from which the character to be associated with the dynamic character key is selected can include without limitation one or more diacritical marks provided by a language, punctuations provided by a language, and the like.

In the embodiment depicted in FIG. 2, character selection subsystem 202 comprises a language determinator 220 and a character selector 224, which are components that can be implemented in software, in hardware, or combinations thereof. In some embodiments, character selection subsystem 202 can have greater or fewer components than those depicted in FIG. 2.

In some embodiments, language determinator 220 is configured to determine the language to be used for performing the character selection processing. This is because, in many instances, the character that is selected to be associated with the dynamic character key can depend upon the language being used. The set of characters from which the character to be associated with the dynamic character key is chosen can depend upon the language being used. For example, different languages provide for different sets of diacritical marks. For example, the set of diacritical marks provided by French is different from the set of diacritical marks provided by Czech, with some overlap. Further, given a particular set of characters for a language from which to select, the particular character that is selected can depend upon usage rules specific to that language. Accordingly, a language determinator 220 is provided that is configured to determine the language to be used for the analysis.

Language determinator 220 can employ various different techniques to determine the language to be used. In one embodiment, the language associated with the currently loaded software keyboard can be identified as the language to be used. In another embodiment, a user-configurable language option can be provided that indicates the language to be used. In yet another embodiment, the application that is being executed by the device can indicate a language preference. In some embodiments, keyboard subsystem 204 can inform language determinator 220 about the language to be used. In yet other embodiments, language determinator 220 can be configured to analyze the input information received from keyboard subsystem 204 and determine the language. A default language can also be configured. Accordingly, language determinator 220 can use various different ways or combinations thereof to determine the language to be used for the character selection analysis.

In some embodiments, once a language has been determined, language determinator 220 can be configured to access and load into memory 226 reference information 228 related to the determined language. This reference information 228 is then used by character selector 224 for selecting a character to be associated with the dynamic character key.

Character selector 224 is configured to perform processing to determine a character, from among multiple characters, to be associated with dynamic character key 212. In some embodiments, as part of this processing, character selector 224 is configured to determine a current context and, based upon the current context and reference information 228, determine a character to be associated with dynamic character key 212 on software keyboard 208. In some embodiments, the character that is associated with dynamic character key 212 is chosen from a set of non-alphanumeric characters. Character selector 224 is configured to track changes in the context and perform processing responsive to these changes to dynamically determine and change the character associated with dynamic character key 212.

In some embodiments, character selection subsystem 202 is configured to convey information regarding the selected character to keyboard subsystem 204. Keyboard subsystem 204 is configured to associate the selected character with dynamic character key 212 such that selection of dynamic character key 212 causes the associated character to be input. Keyboard subsystem 204 is also configured to display the currently associated character on dynamic character key 212. Character selection subsystem 202 can also provide information identifying a default character to be associated with dynamic character key 212 to keyboard subsystem 204.

When a user selects dynamic character key 212, for example, by hitting dynamic character key 212 while typing, the associated character is input and provided to keyboard subsystem 204. Different actions can be performed based upon the input character. For example, if the input character is a diacritical mark, then the character immediately preceding the cursor can be modified using the input diacritical mark to generate a diacritical character. Keyboard subsystem 204 can provide the diacritical character to application 218, which can then display the diacritical character in area 216. In some other embodiment, keyboard subsystem 204 can provide the input diacritical mark to application 218, which can then be configured to determine the diacritical character resulting from the input and to display the diacritical character in area 216 of the application.

In some other embodiments, if the character input upon selection of the dynamic character key is a punctuation, keyboard subsystem 204 can provide the punctuation to application 218, which can insert and display the punctuation at the cursor position.

System 200 depicted in FIG. 2 can be provided in various configurations. In some embodiments, system 200 can be configured as a distributed system where one or more components of system 200 are distributed across one or more networks in the cloud.

Figure 3A:
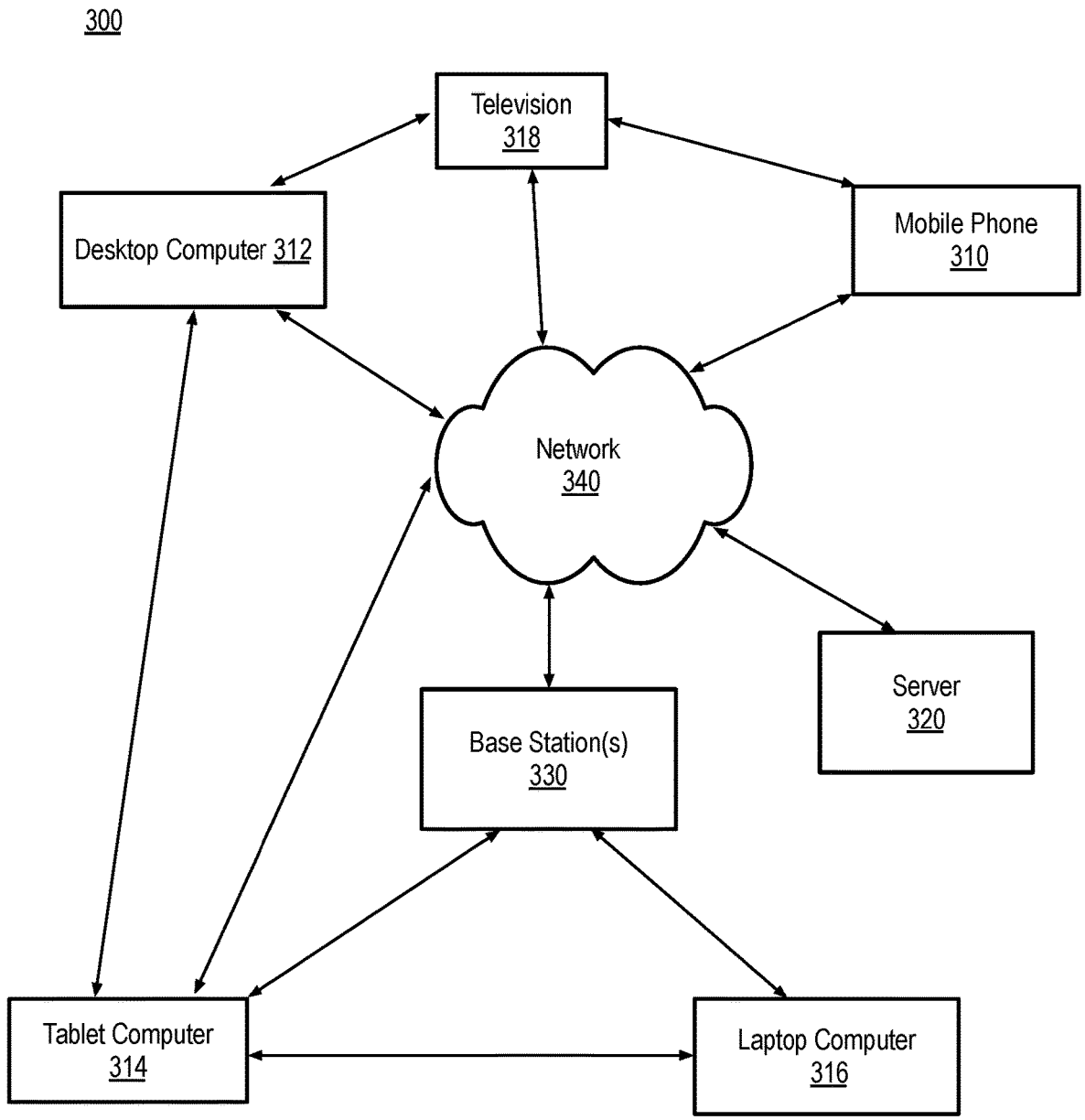
FIG. 3A-3D illustrate environments and systems in which a remote input framework can be provided, according to embodiments described herein.
Figure 3B:
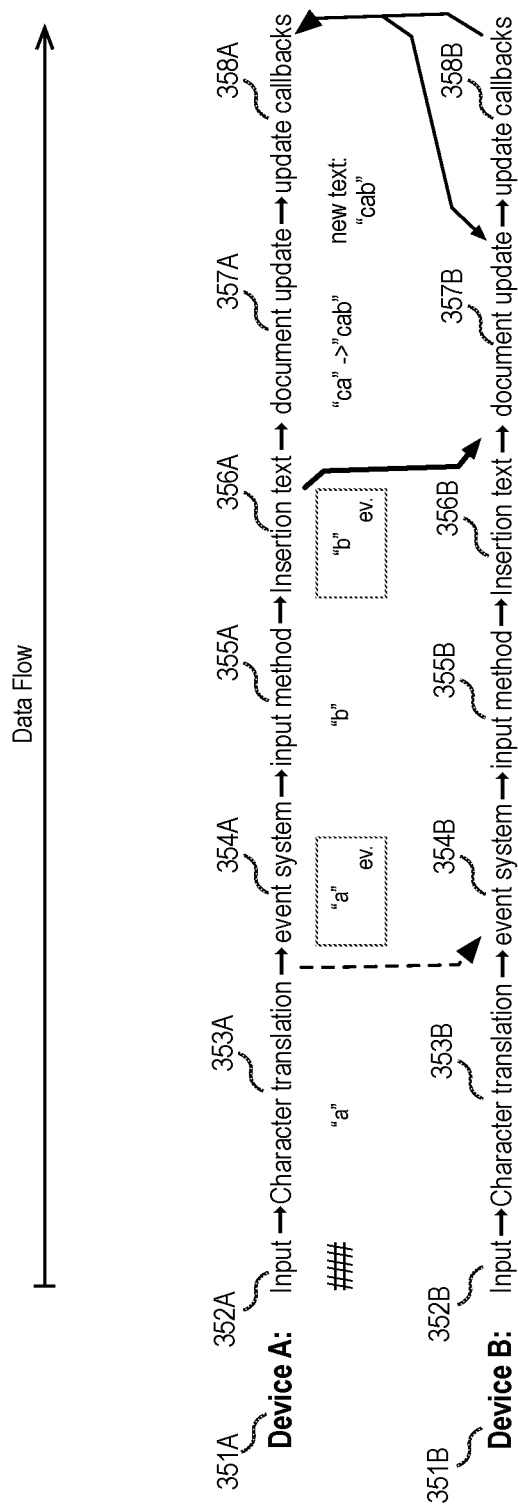
Figure 3C:
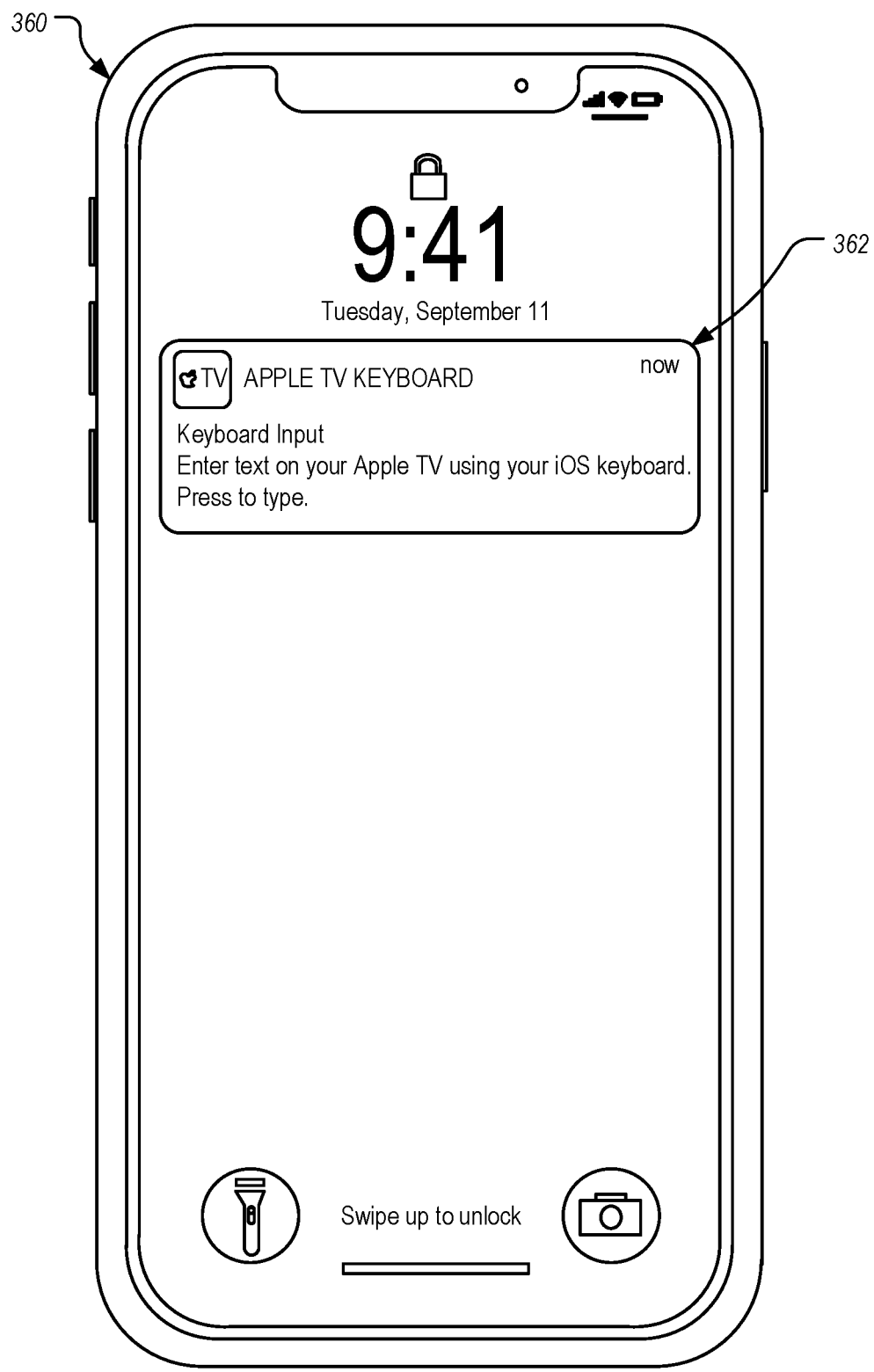
Figure 3D:
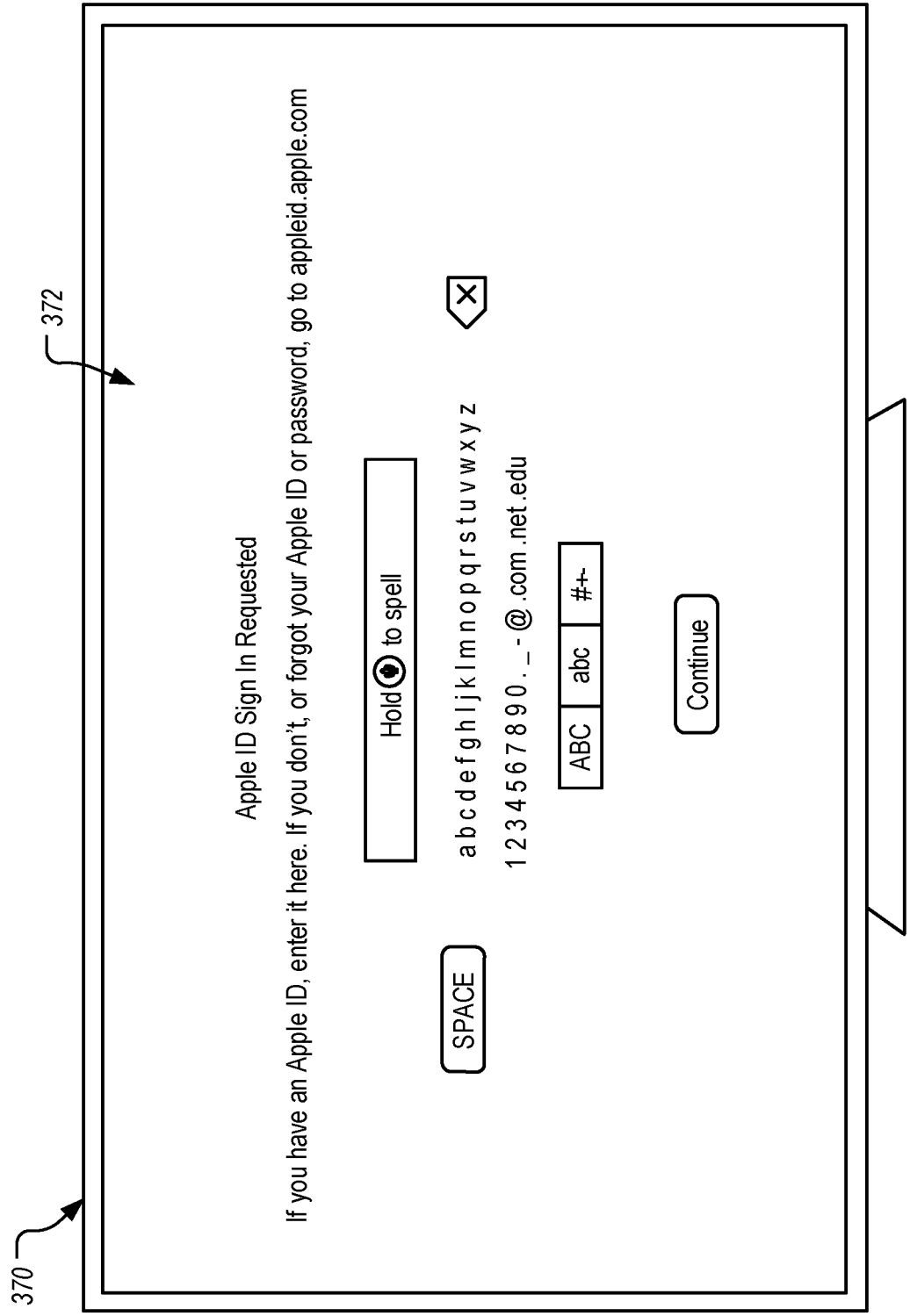

FIG. 3A-3D illustrate environments and systems in which a remote input framework can be provided. FIG. 3A illustrates a high-level schematic illustration of an environment 300 in which remote data input can be implemented, in accordance with some examples. FIG. 3B illustrates a system 350 in which a remote input framework is enabled. FIG. 3C illustrates a host device 360 and associated user interface (UI) that can be used to provide remote input to a second device. FIG. 3D illustrates a remote device 370 and associated UI to which remote input can be provided.

As shown in FIG. 3A, the environment 300 can includes various electronic devices including a mobile phone 310 (e.g., smartphone), a desktop computer 312, a tablet computer 314, a laptop computer 316, or a television 318. The various electronic devices can be within range of one another and can establish a communication channel with one another via a direct communication link (e.g., a Bluetooth link, Wi-Fi direct link, an infrared (IR) link, or the like). Further, various electronic devices can be connected to a network 340, either directly or via a connection to a base station 330. In some examples, base station 330 can be embodied as a network access device (e.g., a router, cellular base station or the like) which provides electronic device 100 with network access.

The network 340 can be any suitable type of wired or wireless network such as a local area network (LAN), a wide area network (WAN), or combination thereof. A LAN can be implemented using various network connection technologies such as, but not limited to Ethernet, wireless LAN (e.g., Wi-Fi), and/or wireless personal area networks (WPAN). LAN communication over the network 340 can be performed using network protocols such as, but not limited to transmission control protocol (TCP) and Internet protocol (IP). A WAN can be implemented over various physical layer types including fiber-optic and copper cabling using protocols such as, but not limited to synchronous optical networking (SONET) and synchronous digital hierarchy (SDH).

The various devices can detect services advertised by other devices via a variety of service advertisement and detection mechanisms such as, but not limited to Bonjour or another zero-configuration network protocol. In some embodiments, the simple service discovery protocol (SSDP) can also be used. For example, a device that supports remote keyboard hosting functionality can advertise such service via a discovery protocol. Devices that support remote input via a remote keyboard host can discover such devices and send a request to initiate a remote input session to such devices when remote input would be advantageous.

Having described various structures of an electronic device which can be adapted to implement remote data input between electronic devices, operating aspects of communication channel election will be described with reference to FIGS. 4-5, which are flowcharts illustrating logic to implement in a method to implement remote data input between multiple devices according to embodiments. In some embodiments the logic depicted in the flowchart of FIGS. 4-5 can be implemented by the one or more of the controllers in the I/O subsystem 106, alone or in combination with other components of the device 100. In some examples the logic can be compiled machine code that can execute directly on a system or can be high-level or intermediate level code that can be compiled before execution, for example, via a just-in-time (JIT) compiler. The logic can be accompanied by certificates or signatures that allow the logic to execute on a client device. In one embodiment, the logic can be encrypted code that is decrypted before or during execution.

As shown in FIG. 3B, in one embodiment a system 350 can include two parallel keyboard stacks on two or more devices (e.g., device A 351A, device B 351B). Each keyboard stack includes logic that operates during multiple stages of input processing. The keyboard stack includes components similar to those illustrated in system 200 of FIG. 2. First, an input 352A-352B is received at each stack. The input can be a physical input signal from a physical keyboard or a virtual keyboard, for example, on a touch screen. The input 352A-352B corresponds to a keypress and is received as a numerical code that corresponds to a given key on a keyboard or position on a virtual keyboard. The input 352A-352B is provided to a character translation unit 353A-353B that generates characters based on the input 352A-352B. The generated characters are provided to an event system 354A-354B associated with the respective devices 351A-351B. The event system can be related to the event system shown in FIG. 1B. The event system 354A-354B can distribute an event to an input method 355A-355B. The input method 355A-355B can generate insertion text 356A-356B that is used to generate a document update 357A-357B. In one embodiment, the input method 355A can perform an autocorrect operation to automatically correct an input provided by the event system 354A-354B. After the document update 357A-357B, update callbacks 358A-358B can be performed to synchronize input system state.

Embodiments described herein provide a remote input framework to enable a first device (e.g., device A 351A) to act as a remote input source for a second device (e.g., device B 351B). Existing remote input implementations can provide data from character translation unit 353A on the first device to the event system 354B on the second device. Other remote implementations can act to synchronize data during update callbacks 358A-358B. The relay of character translation data is lightweight but limited in functionality. Remote input based on update callbacks 358A-358B enables greater functionality but may be fragile and error prone in some implementations. Instead, the remote input framework provided by embodiments described herein provide a conduit through which insertion text 356A of the first device stack is provided as a document update 357B on the second device. This remote input framework is flexible, stable, and allows document and input state to be synchronized between devices.

As shown in FIG. 3C, a host device 360, such as a smart phone device or another type of electronic device, can provide a prompt 362 to allow a user of the host device 360 to enable use of a local keyboard as an input device for a remote device. In one embodiment the host device 360 can be an iPhone®, iPad®, iPod touch®, or another mobile or electronic device provided by Apple Computer, Inc. of Cupertino, Calif. The prompt 362 can be presented when the host device 360 is within direct wireless communication range with a remote device or when connected to the same network as the remote device. Upon selection of the prompt 362, a local keyboard of the host device 360 can be presented via the UI of the host device 360. Input received via the UI of the device can then be relayed to a connected remote device, such as remote device 370 in FIG. 3D below. The keyboard that is presented at the UI can be any form of touch keyboard described herein. Alternatively, if the host device 360 is coupled with a physical keyboard, the physical keyboard can be used to provide input instead of a soft keyboard presented via the UI of the host device 360.

As shown in FIG. 3D, a remote device 370, such as but not limited to a television or television set top box, can receive remote input from the host device 360 of FIG. 3C using the remote input framework described herein. In one embodiment the remote device 370 is an Apple TV® digital media extender device. The remote input data can be presented via the UI 372 of the remote device 370 as though the input were received as local input to the remote device 370. The remote input framework described herein can be used to enable alternative input methods to the individual selection of characters via a wireless remote or requiring the direct attachment of a keyboard input device to remote device 370. State information associated with the remote device 370 can be relayed to the host device to allow the host device to adopt the input state of the remote device 370. This state information can enable the keyboard of the host device to perform character selection and input suggestion as though the keyboard of the host device were a keyboard of the remote device 370. Additionally, multiple host devices can provide simultaneous input to the remote device and input state can be synchronized between the multiple host devices.

Figure 4:
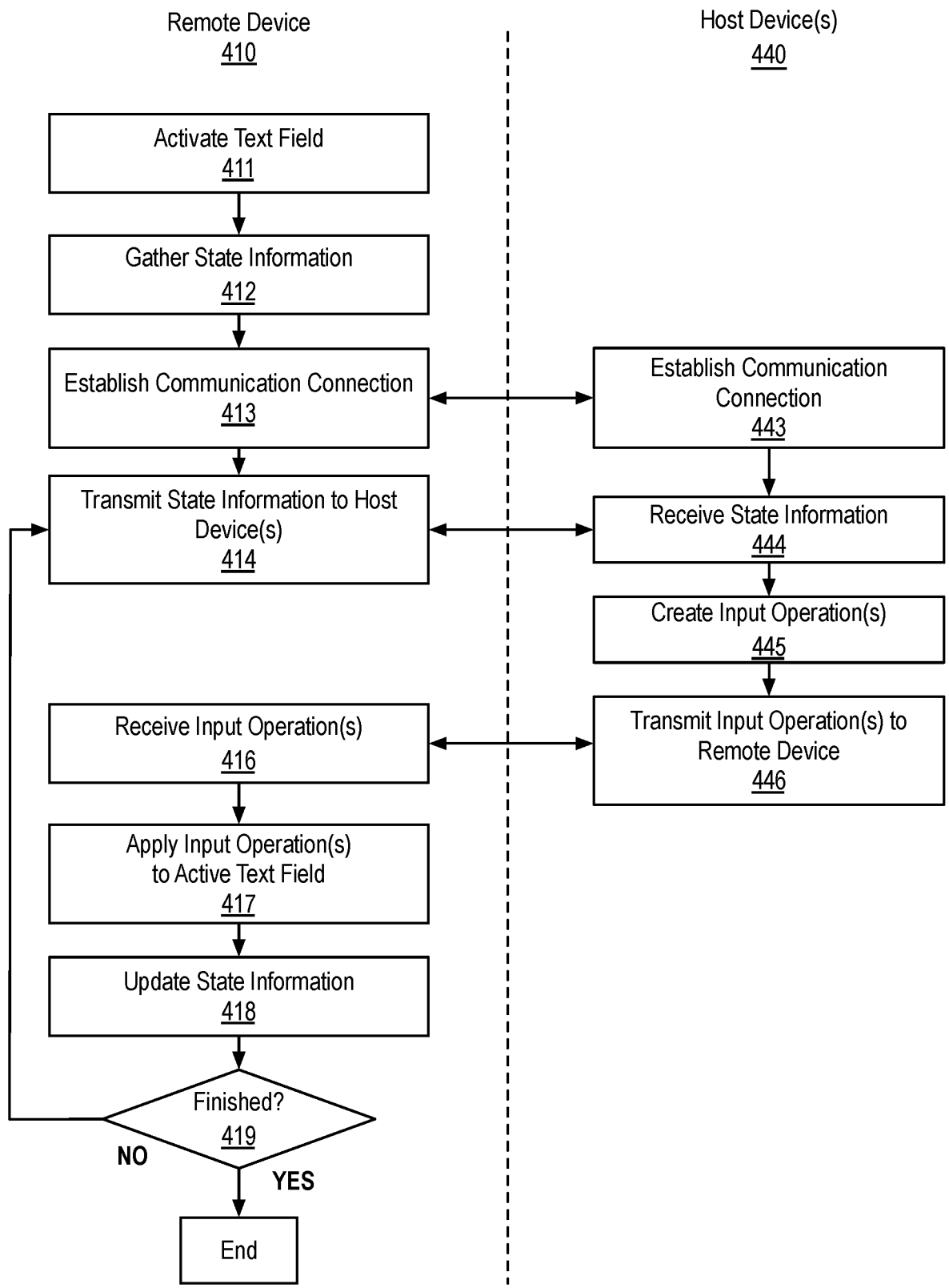
FIG. 4 is a flow diagram of a process to implement remote data input, according to an embodiment.

FIG. 4 illustrates operations to enable interaction between a remote device 410 and one or more host devices 440. In some examples the remote device 410 can be embodied as an electronic device such as a television 318, while the host device(s) 440 can be embodied as one or more of, for example, a mobile phone 310, a desktop computer 312, a tablet computer 314, or a laptop computer 316.

At operation 411 the remote device activates a text field on an input device. In some examples the remote device can activate a text field for input on an input device such as a television screen. At operation 412 the remote device gathers state information for the text field. For example, the remote device can gather state information relating to the service(s) available through the text field, the current input to the text field, and the like. In one embodiment the state information also includes application internal state 192 as shown in FIG. 1B. In one embodiment, before state information is gathered, the remote device 410 can determine whether one or more host device(s) 440 are available to provide remote input data. The remote device 410 can determine the presence of a host device via a service discovery protocol described herein, such as but not limited to Bonjour or SSDP. In one embodiment, the state information can enable a keyboard on the one more host device(s) 440 to perform character completion, auto-correct, and input prediction operations that would be suggested by a keyboard on the remote device 410.

At operation 413 the remote device 410 sends a message to the host device(s) 440 to establish a communication connection with the one or more host device(s). The host device(s) 440 can establish reciprocal connections at operation 443. In some examples the communication connection can be established as a direct communication connection via a wireless connection protocol such as Bluetooth, Wi-Fi direct, or via an infrared connection. In other examples the communication connection can be established via at least one intermediary device such as a base station 330 depicted in FIG. 3A. In one embodiment the communication session can be established at least in part over a wired network if the remote device 410 and/or the host device 440 are connected to a wired network, such as an Ethernet network.

At operation 414 the remote device 410 transmits the state information to the host device(s) with which a communication connection was established in operation 413, and the host device(s) receive the state information at operation 444. At operation 445 the host device(s) create one or more input operations for the remote device 410. The state information received at operation 444 can determine the input operations that are created for the remote device 410. Details about creating the one or more input operations on the host device(s) 440 will be described below with reference to FIG. 5.

At operation 446 the one or more host device(s) 440 transmit the input operation(s) generated in operation 445 to the remote device 410, which receives the input operation(s) at operation 416. In some examples the remote device 410 can receive conflicting input operations from different host device(s) 440. In such examples the remote device can implement a contention algorithm to determine which of the conflicting inputs to apply to the text field on the remote device. For example, the remote device 410 can apply the first received input from the host device(s). Alternatively, a remote device 410 which receives multiple different input operations can determine implement the input operation which has the highest frequency of the received input operations. In one embodiment, when an input operation is received from one of multiple different host devices 440, the host devices from which input is not received can resynchronize state information to show the applied input.

At operation 417 the remote device 410 applies the input from operation 416 to the text field. In some examples the remote device performs a document update operation on the text field to apply the input operation to the text field. For example, if the input operation represents a character (e.g., the letter "b") and the current state of the text field comprises two characters (e.g., "ca") then the text field document is updated from "ca" to "cab" in response to the input operation.

At operation 418 the state information associated with the text field is updated. For example, the status of the text field can be updated to reflect the current context of the document following completion of the document update operation in operation 417, as well as any updated application internal state.

If, at operation 419, the input operation is not finished then control passes back to operation 414 and the remote device 410 transmits the updated state information associated with the text field to the host device(s). Thus, operations 414 through 419 define a loop pursuant to which a host device can transmit state information to remote devices, receive input operations, from the remote devices, select an input operation to apply to the text field, and update the text field with the input operation(s) from the remote devices.

Figure 5:
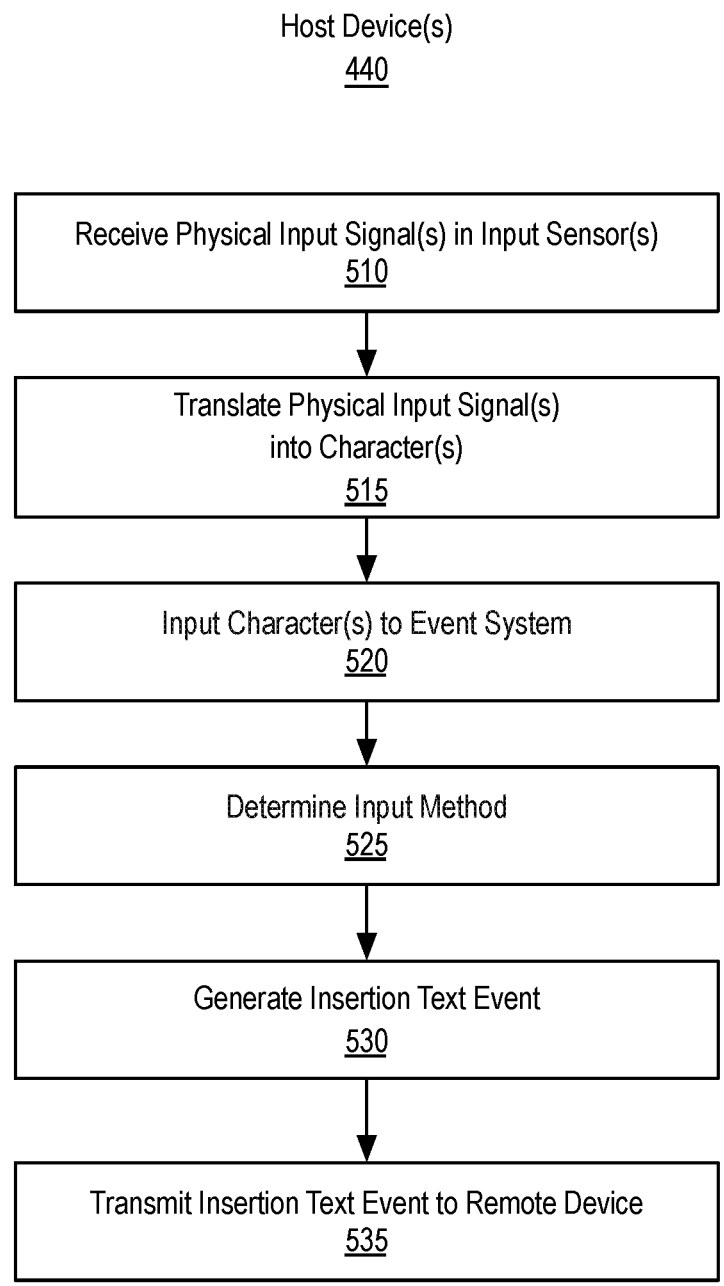
FIG. 5 is a flow diagram of a process to implement remote data input, according to an embodiment.

FIG. 5 depicts operations implemented by the host device(s) 440 to create input operations as described with reference to operation 445. At operation 510 the host device(s) receive a physical input signals in one or more input sensors of the host device. For example, referring to FIG. 1A, the physical input can be received on one or more of a touch sensor in a touch sensitive display system 112, an optical sensor 164, or a contact intensity sensor 165 of the host device(s) 440.

At operation 515 the host device(s) 400 translate the input signal(s) into one or more characters. For example, referring to FIG. 2, the character selection subsystem 202 can translate the physical input signal(s) from the sensor(s) to one or more characters. The translation of the physical input signal(s) into characters can be performed at least in part based on state information received at operation 444 of FIG. 4. For example, a language configuration of the remote device can be used at the host device to translate physical input signal(s) into characters. Additionally, the keyboard characters presented on the host device can automatically change based on state information received from the remote device. At operation 520 the character(s) generated in operation 515 are input to an event system associated with the host device(s) 440. The event can be distributed to other components of the host device(s) 440 by an input system of the host device.

At operation 525 an input method for the input character(s) determined in operation 515 is determined. In some examples an autocorrect function can be applied at this stage (e.g., an input character "a" can be autocorrected to an input character "b"). In one embodiment, the autocorrect operation can be performed based on state information received at operation 444 of FIG. 4. At operation 530 an insertion text event is generated for the input character. In some examples the insertion text event can be either an insertion action or a deletion action. At operation 535 the insertion text event is transmitted to the remote device, as described with reference to operation 446.

One skilled in the art will recognize that the logic described with reference to FIG. 4 and FIG. 5 can be implemented as part of an input/output protocol stack of an electronic device. For example, referring to FIG. 1B, the logic described with reference to FIG. 4 and FIG. 5 can be implemented as part of the peripherals interface 118. Thus, each electronic device can implement both the operations of the remote device 410 and the host device 440, thereby allowing the electronic devices to synchronize their respective text fields in response to inputs from multiple electronic devices.

Figure 6:
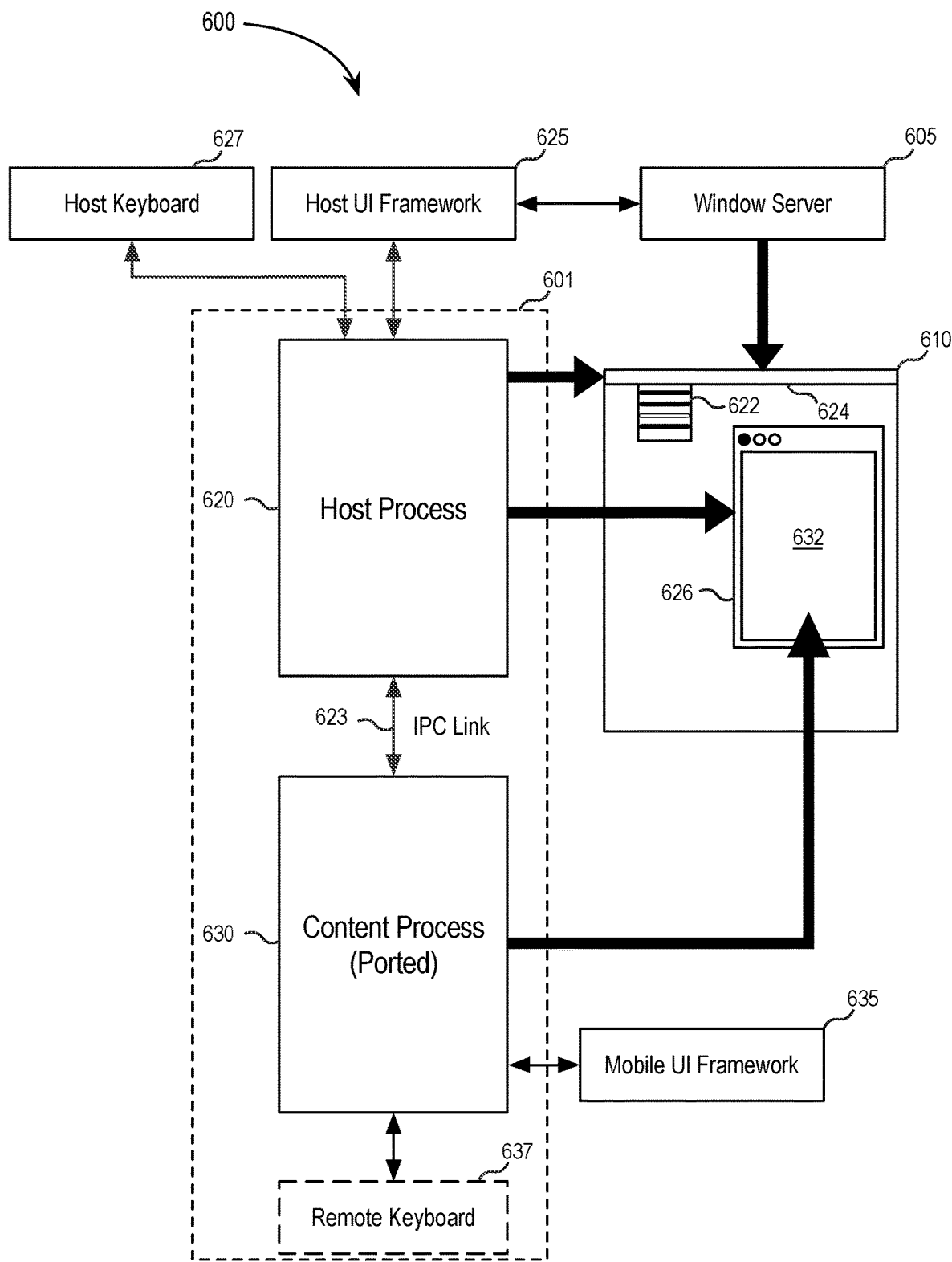
FIG. 6 illustrates a multi-process model to support porting applications to a different platform, according to an embodiment.

The remote text input framework described herein can also be used to enable data input to a host platform to be relayed to a hosted mobile application executing on a host platform. FIG. 6 illustrates a multi-process model 600 to support multi-platform applications, according to an embodiment. In one embodiment, the multi-process model 600 enables an application 601 to natively execute on a platform that is different from the platform for which the application was originally designed. The application 601 can be compiled to executed on the different platform without requiring any modification to the core program code of the application. The application 601 can execute as two or more processes, including a host process 620 and a content process 630. The content process can be linked against the original interface (UI) framework of the application and the host process can be linked against the UI framework of the platform on which the application is to be executed. For example, in one embodiment program code for a mobile application that is designed for execution on a mobile platform can be compiled for execution on a laptop or desktop platform. The program code for the mobile application can be compiled to execute as the content process 630 and is linked against a mobile UI framework 635 for the mobile platform. During execution, the content process 630 can establish an inter-process communication link (IPC link 623) with the host process, which is linked against a host UI framework 625. The host UI framework 625 can provide access to user interface elements for the platform on which the application 601 executes. The IPC link 623 can be established via a variety of inter-process communication methods including, but not limited to sockets, pipes, ports, message queues, and shared memory. In one embodiment, the IPC link 623 is established via the XPC framework available from Apple® Inc. As described herein, a framework refers to one or more libraries that include objects, methods, data, and other information to facilitate fundamental aspects of an application that executes on operating environments described herein.

The host UI framework 625 and the mobile UI framework 635 can each provide objects used by the host process 620 and the content process 630 that are used to implement user interfaces on the respective platforms. The UI frameworks enable the generation and manipulation of windows, panels, buttons, menus, scrollers, and text fields, and the like, and handle the details to of the operations used to draw to a display, including communicating with hardware devices and screen buffers, clearing areas of the screen before drawing, clipping views, etc. However, the host UI framework 625 and mobile UI framework 635 have fundamental differences that should be addressed to enable a mobile application linked against the mobile UI framework 635 to execute correctly on the host platform. For example, some API calls, classes, and objects that serve similar functions differ between the mobile UI framework 635 and the host UI framework 625. Some functions, such as view animation, may differ between the mobile UI framework 635 and the host UI framework 625. Additionally, the mobile UI framework 635, in one embodiment, does not contain interfaces to manage the window server 605, which can be part of the operating system of the host (e.g., laptop, desktop, etc.) platform. Accordingly, the host UI framework 625 can interface with the window server 605 on behalf of the mobile UI framework 635. The host UI framework 625 can communicate with the window server 605 to scale windows, allocate memory buffers for windows, render into window buffers, and generally perform operations to display windows containing UI elements for the application 601.

In one embodiment the host process 620, via the host UI framework 625 and the window server 605, can generate and display a window frame 626 and menubar 622, and status bar 624 on behalf of the content process 630. The content process 630 can then use the mobile UI framework 635 to create data objects and data for a window buffer 632 that contains content to be displayed for the application 601. Information to describe and/or reference the created data objects and data for the window buffer 632 can be relayed via the IPC link 623 to the host process 620. The host process 620 can then use the host UI framework 625 to modify details of the graphical elements that make up contents of the status bar 624, menubar 622, and window frame 626. The host process 620 can then automatically display the window buffer 632 created by the content process within the window frame 626.

In one embodiment, details for the graphical interface elements to be displayed by the host process 620 can be determined automatically based on metadata associated with the content process 630. For example, a title for the window frame 626 can be determined based on the name of the content process 630 or the name of the mobile application on which the content process 630 is based. Some graphical elements of the status bar 624 or menubar 622 can also be automatically determined based on metadata associated with the content process 630, or information provided by the content process via the IPC link 623.

In one embodiment, details for the graphical interface elements to be displayed by the host process 620 are determined interactively with the content process 630. For example, one or more elements of the menubar 622 that will be displayed by the host process 620 can be validated with the content process 630 before display. Elements that do not successfully validate can be grayed-out or otherwise marked as un-selectable when the menubar 622 is displayed.

The remote data input framework described herein can be used to enable a host keyboard 627 of the host platform to provide remote input of text and other data to the content process 630 as though the text and other data were provided by a remote keyboard 637 that would provide text input to the content process 630. The techniques and operations described herein can be applied, with the host keyboard 627 as a keyboard of one of the host device(s) 440 and the remote keyboard 637 as the remote device 410.

For embodiments described herein, exemplary mobile platforms from which applications can be ported include mobile phone, television set-top box, console gaming system, application enabled television, or tablet computing device platforms. In various embodiments, the mobile application code can be compiled and executed via binary translation or can be compiled for direct execution by the processor within the laptop or desktop platform. In some embodiments, a common development environment can be provided for the mobile, laptop, and desktop platforms. The common development environment can be configured to enable application code for a mobile application to be compiled for execution on the laptop and desktop platform without requiring modifications to the application code.

Embodiments described herein include one or more application programming interfaces (APIs) in an environment in which calling program code interacts with other program code that is called through one or more programming interfaces. Various function calls, messages, or other types of invocations, which further may include various kinds of parameters, can be transferred via the APIs between the calling program and the code being called. In addition, an API may provide the calling program code the ability to use data types or classes defined in the API and implemented in the called program code.

An API allows a developer of an API-calling component (which may be a third-party developer) to leverage specified features provided by an API-implementing component. There may be one API-calling component or there may be more than one such component. An API can be a source code interface that a computer system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some embodiments, the API-implementing component may provide more than one API, each providing a different view of or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other embodiments, the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component can return a value through the API in response to an API call from an API-calling component. While the API defines the syntax and result of an API call (e.g., how to invoke the API call and what the API call does), the API f not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some embodiments, an API may allow a client program to use the services provided by a Software Development Kit (SDK) library. In other embodiments, an application or other client program may use an API provided by an Application Framework. In these embodiments, the application or client program may incorporate calls to functions or methods provided by the SDK and provided by the API or use data types or objects defined in the SDK and provided by the API. An Application Framework may in these embodiments provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low-level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however, the API may be implemented in terms of a specific programming language. An API-calling component can, in one embedment, call APIs from different providers such as a set of APIs from an OS provider and another set of APIs from a plug-in provider and another set of APIs from another provider (e.g., the provider of a software library) or creator of the another set of APIs.

Figure 7:
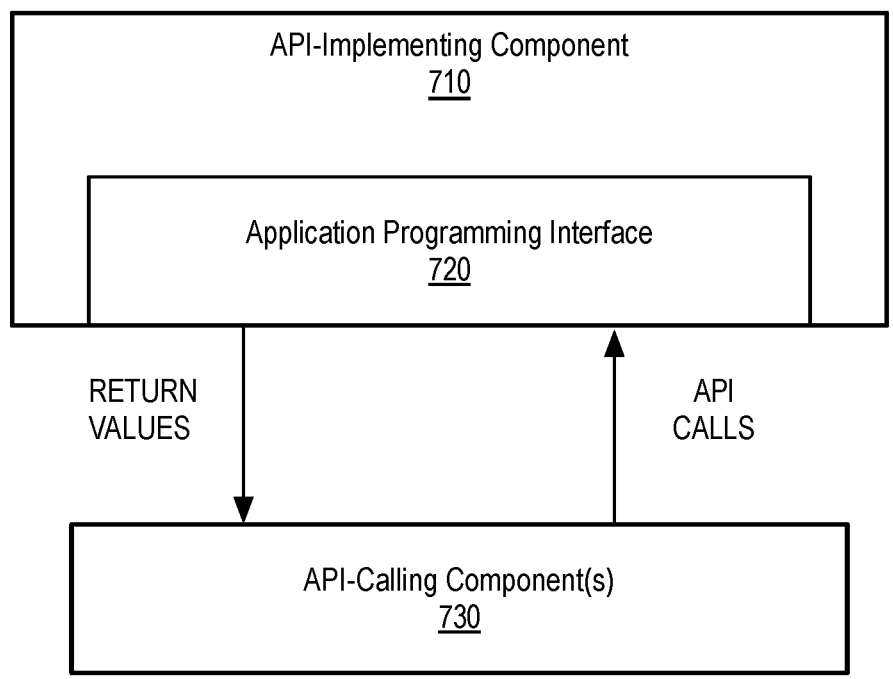
FIG. 7 is a block diagram illustrating an exemplary API architecture, which may be used in some embodiments of the invention.

FIG. 7 is a block diagram illustrating an exemplary API architecture, which may be used in some embodiments of the invention. As shown in FIG. 7, the API architecture 700 includes the API-implementing component 710 (e.g., an operating system, a library, a device driver, an API, an application program, software or other module) that implements the API 720. The API 720 specifies one or more functions, methods, classes, objects, protocols, data structures, formats and/or other features of the API-implementing component that may be used by the API-calling component 730. The API 720 can specify at least one calling convention that specifies how a function in the API-implementing component receives parameters from the API-calling component and how the function returns a result to the API-calling component. The API-calling component 730 (e.g., an operating system, a library, a device driver, an API, an application program, software or other module), makes API calls through the API 720 to access and use the features of the API-implementing component 710 that are specified by the API 720. The API-implementing component 710 may return a value through the API 720 to the API-calling component 730 in response to an API call.

It will be appreciated that the API-implementing component 710 may include additional functions, methods, classes, data structures, and/or other features that are not specified through the API 720 and are not available to the API-calling component 730. It should be understood that the API-calling component 730 may be on the same system as the API-implementing component 710 or may be located remotely and accesses the API-implementing component 710 using the API 720 over a network. While FIG. 7 illustrates a single API-calling component 730 interacting with the API 720, it should be understood that other API-calling components, which may be written in different languages (or the same language) than the API-calling component 730, may use the API 720.

The API-implementing component 710, the API 720, and the API-calling component 730 may be stored in a machine-readable medium, which includes any mechanism for storing information in a form readable by a machine (e.g., a computer or other data processing system). For example, a machine-readable medium includes magnetic disks, optical disks, random-access memory; read only memory, flash memory devices, etc.

Figure 8A:
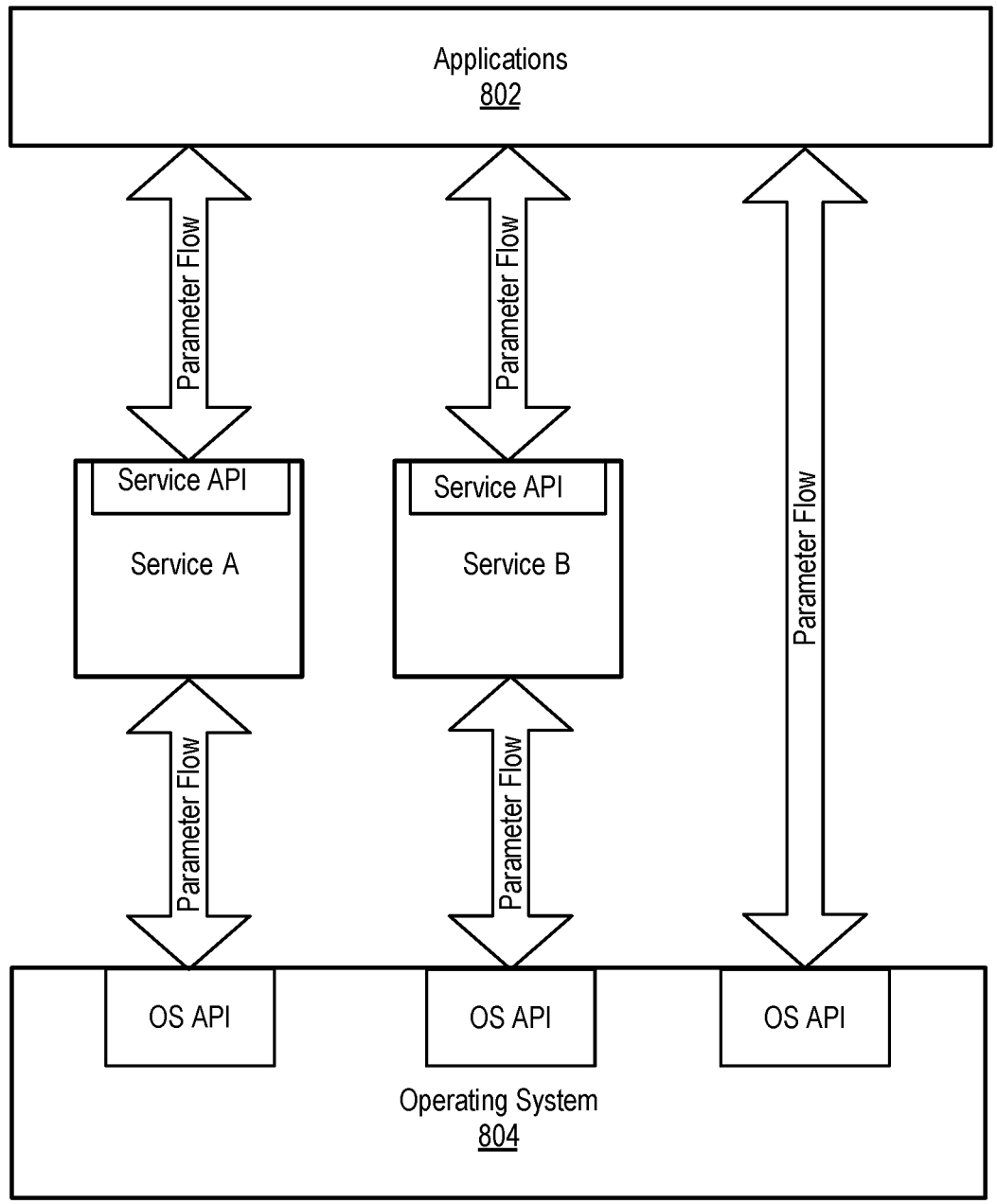
FIG. 8A-8B are block diagrams of exemplary API software stacks according to embodiments.
Figure 8B:
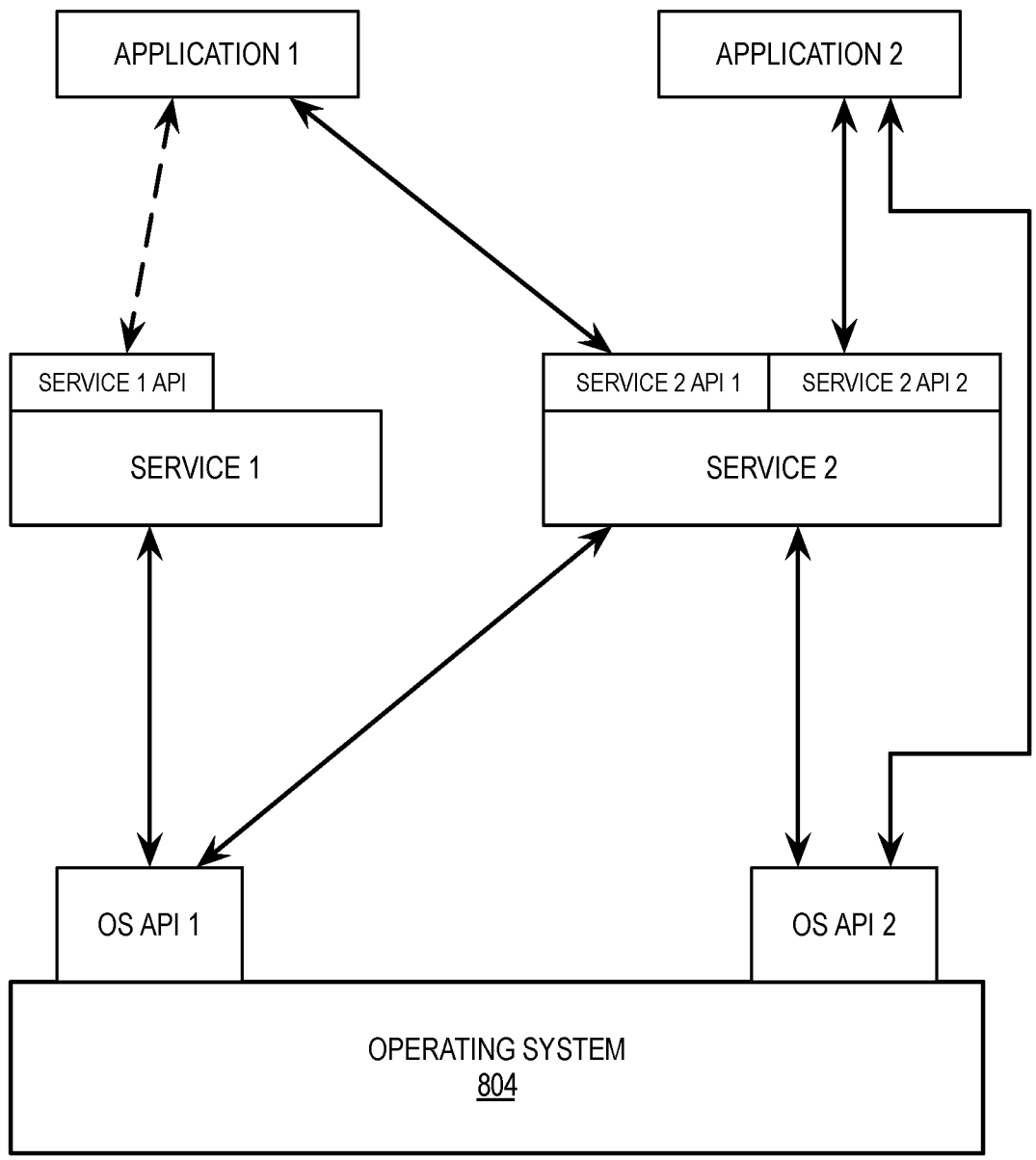

FIG. 8A-8B are block diagrams of exemplary API software stacks 800, 810, according to embodiments. FIG. 8A shows an exemplary API software stack 800 in which applications 802 can make calls to Service A or Service B using Service API and to Operating System 804 using an OS API. Additionally, Service A and Service B can make calls to Operating System 804 using several OS APIs.

FIG. 8B shows an exemplary software stack 810 including Application 1, Application 2, Service 1, Service 2, and Operating System 804. As illustrated, Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 9:
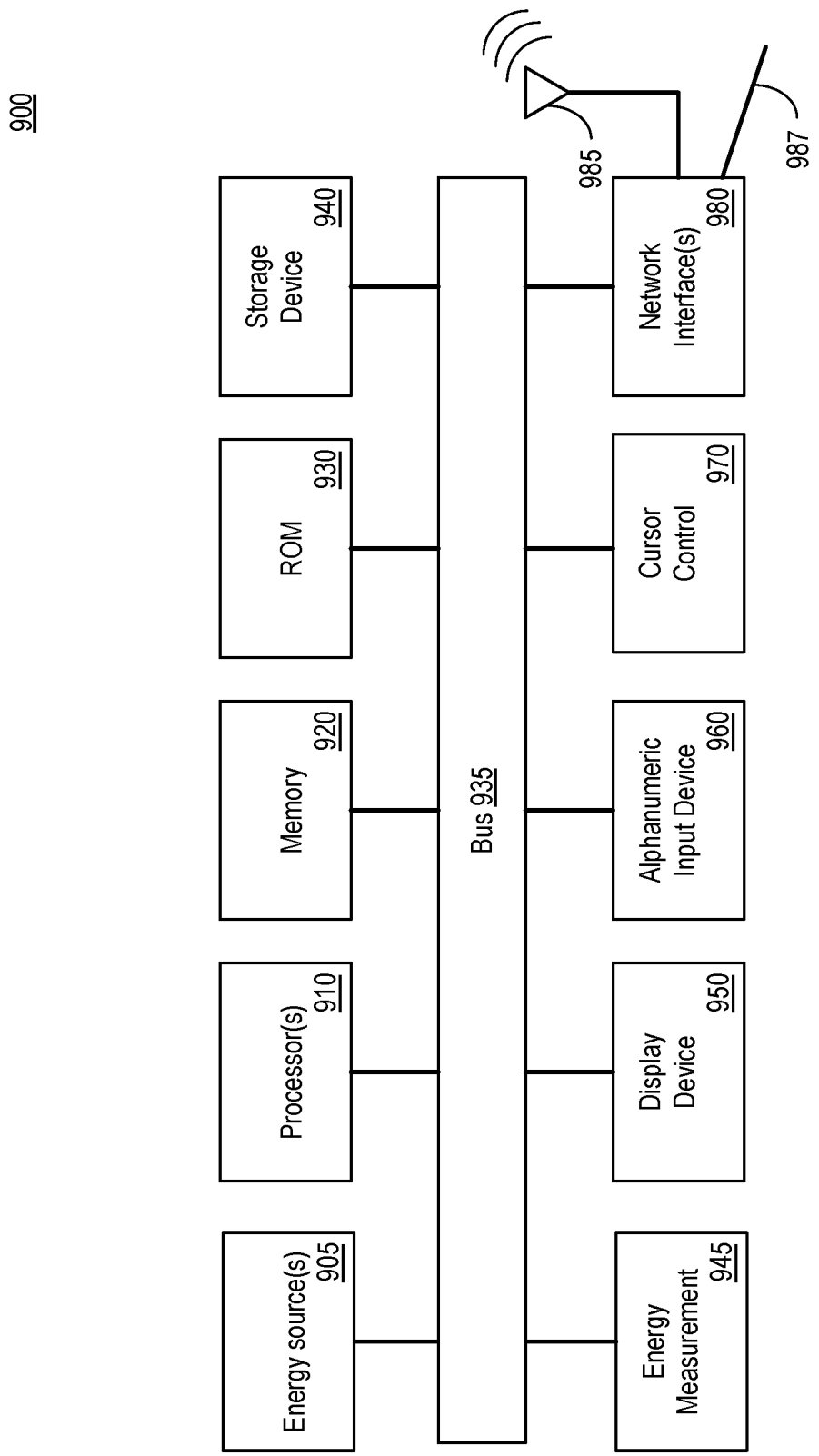
FIG. 9 is a block diagram of a computing system, according to an embodiment.

FIG. 9 is a block diagram of a computing system 900, according to an embodiment. The illustrated computing system 900 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices, smart appliance devices, or one or more implementations of a smart media playback device. Alternative computing systems may include more, fewer and/or different components. The computing system 900 can be used to provide the computing device and/or a server device to which the computing device may connect.

The computing system 900 includes bus 935 or other communication device to communicate information, and processor(s) 910 coupled to bus 935 that may process information. While the computing system 900 is illustrated with a single processor, the computing system 900 may include multiple processors and/or co-processors. The computing system 900 further may include memory 920, such as random-access memory (RAM) or other dynamic storage device coupled to the bus 935. The memory 920 may store information and instructions that may be executed by processor(s) 910. The memory 920 may also be used to store temporary variables or other intermediate information during execution of instructions by the processor(s) 910.

The computing system 900 may also include read only memory (ROM) 930 and/or another data storage device 940 coupled to the bus 935 that may store information and instructions for the processor(s) 910. The data storage device 940 can be or include a variety of storage devices, such as a flash memory device, a magnetic disk, or an optical disc and may be coupled to computing system 900 via the bus 935 or via a remote peripheral interface.

The computing system 900 may also be coupled, via the bus 935, to a display device 950 to display information to a user. The computing system 900 can also include an alphanumeric input device 960, including alphanumeric and other keys, which may be coupled to bus 935 to communicate information and command selections to processor(s) 910. Another type of user input device includes a cursor control 970 device, such as a touchpad, a mouse, a trackball, or cursor direction keys to communicate direction information and command selections to processor(s) 910 and to control cursor movement on the display device 950. The computing system 900 may also receive user input from a remote device that is communicatively coupled via one or more network interface(s) 980.

The computing system 900 further may include one or more network interface(s) 980 to provide access to a network, such as a local area network. The network interface(s) 980 may include, for example, a wireless network interface having antenna 985, which may represent one or more antenna(e). The computing system 900 can include multiple wireless network interfaces such as a combination of Wi-Fi, Bluetooth®, near field communication (NFC), and/or cellular telephony interfaces. The network interface(s) 980 may also include, for example, a wired network interface to communicate with remote devices via network cable 987, which may be, for example, an Ethernet cable, a coaxial cable, a fiber optic cable, a serial cable, or a parallel cable.

In one embodiment, the network interface(s) 980 may provide access to a local area network, for example, by conforming to IEEE 802.9 standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 980 may provide wireless communications using, for example, Time Division, Multiple Access (TDMA) protocols, Global System for Mobile Communications (GSM) protocols, Code Division, Multiple Access (CDMA) protocols, Long Term Evolution (LTE) protocols, and/or any other type of wireless communications protocol.

The computing system 900 can further include one or more energy sources 905 and one or more energy measurement systems 945. Energy sources 905 can include an AC/DC adapter coupled to an external power source, one or more batteries, one or more charge storage devices, a USB charger, or other energy source. Energy measurement systems include at least one voltage or amperage measuring device that can measure energy consumed by the computing system 900 during a predetermined period of time. Additionally, one or more energy measurement systems can be included that measure, e.g., energy consumed by a display device, cooling subsystem, Wi-Fi subsystem, or other frequently used or high-energy consumption subsystem.

In the foregoing description, example embodiments of the disclosure have been described. It will be evident that various modifications can be made thereto without departing from the broader spirit and scope of the disclosure. The specification and drawings are, accordingly, to be regarded in an illustrative sense rather than a restrictive sense. The specifics in the descriptions and examples provided may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein. Additionally, various components described herein can be a means for performing the operations or functions described herein.

To the extent that concepts described herein access, relay, or make use of personally identifiable data while providing a remote input framework, the access or use of such data should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users. Additionally, a user on an electronic device can elect to opt-in or opt-out of the use of any of the features described herein.

Embodiments described herein provide techniques to manage remote data input for electronic devices. In some embodiments, techniques described herein enable direct communication between the protocol stacks for input devices (e.g., keyboards, touch screens, touch pads, etc.) of electronic devices such that data (e.g., characters) input to the input device of a first electronic device is communicated to the protocol stack for an input device on a second electronic device.

One embodiment provides an electronic device comprising a communication interface to establish a communication connection with a remote device, a non-transitory machine-readable medium to store instructions, one or more processors to execute the instructions, a memory coupled to the one or more processors, the memory to store instructions read from the non-transitory machine-readable medium. The instructions, when executed by the one or more processors, cause the one or more processors to receive state information relating to a text field on the remote device via the communication interface, receive, in an input/output subsystem, a physical input signal from an input sensor, translate the physical input signal from the input sensor into a character, the input signal translated at least in part based on the state information related to the text field, generate an insertion text event associated with the character, the insertion text event associated with an event system of the remote device, and transmit the insertion text event from the electronic device to the remote device.

One embodiment provides for a non-transitory machine-readable medium storing instructions which, when executed by one or more processors of an electronic device, configure the one or more processors to receive state information relating to a text field on a remote device via a communication interface of the electronic device, receive, via an input/output subsystem, a physical input signal from an input sensor, translate the physical input signal from the input sensor into a character, generate an insertion text event associated with the character, the insertion text event associated with an event system of the remote device, and transmit the insertion text event from the electronic device to the remote device.

One embodiment provides for an electronic device, comprising a non-transitory machine-readable medium to store instructions, one or more processors to execute the instructions, and a memory coupled to the one or more processors. The memory stores instructions which, when executed by the one or more processors, cause the one or more processors to activate a text field on an input device, detect a host device having support for a remote input service, gather state information associated with the text field, transmit the state information to the host device, receive an input operation from the host device, and apply the input operation to the text field.

One embodiment provides for a non-transitory machine-readable medium storing instructions which, when executed by one or more processors of an electronic device, configure the one or more processors to activate a text field on an input device, detect a host device having support for a remote input service, gather state information associated with the text field, transmit the state information to the host device, receive an input operation from the host device, and apply the input operation to the text field.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. An electronic device, comprising:
    a communication interface;
    a non-transitory machine-readable medium to store instructions;
    one or more processors to execute the instructions;
    a memory coupled to the one or more processors, the memory to store instructions read from the non-transitory machine-readable medium, wherein the instructions, when executed by the one or more processors, cause the one or more processors to:
        receive a request from a remote device to establish a communication connection via the communication interface;
        establish, in response to the request from the remote device, a communication connection with the remote device;
        receive state information relating to services available through a text field on the remote device via the communication interface, the state information indicating a context of a document being processed at the text field;
        receive, in an input/output subsystem, a physical input signal from an input sensor;
        translate the physical input signal from the input sensor into a character, the physical input signal translated at least in part based on the state information for the services received from the remote device, the services including character completion, auto-correct and input prediction;
        generate an insertion text event associated with the character, the insertion text event associated with an event system of the remote device; and
        transmit the insertion text event from the electronic device to the remote device.

2. The electronic device as in claim 1, the input sensor comprising at least one of a touch sensor, an optical sensor, or a contact intensity sensor.

3. The electronic device as in claim 1, the memory further to store instructions which, when executed by the one or more processors, cause the one or more processors to:
    generate an input event associated with the character, the input event associated with the event system of the electronic device, and distribute the input event via the event system to one or more components of the electronic device, wherein the electronic device and the remote device include a keyboard stack having parallel components.

4. The electronic device as in claim 1, the memory further to store instructions which, when executed by the one or more processors, cause the one or more processors to:
    configure display of one or more elements of a keyboard presented on the electronic device based on the state information received from the remote device,
    wherein the state information includes an active set of views in a view hierarchy on the remote device and the insertion text event is generated based on the active set of views.

5. The electronic device as in claim 4, wherein the communication interface is to establish the communication connection with the remote device in response to a message received from the remote device.

6. The electronic device as in claim 5, the memory further to store instructions which, when executed by the one or more processors, cause the one or more processors to advertise a remote input service, wherein the message received from the remote device includes a request to access the remote input service.

7. The electronic device as in claim 1, the memory further to store instructions which, when executed by the one or more processors, cause the one or more processors to determine an input method associated with the character, the input method to generate insertion text associated with the insertion text event.

8. A non-transitory machine-readable medium storing instructions which, when executed by one or more processors of an electronic device, configure the one or more processors to:

receive state information relating to one or more services available through a text field on a remote device via a communication interface of the electronic device, the state information indicating a context of a document being processed at the text field;

receive, via an input/output subsystem, a physical input signal from an input sensor;

translate the physical input signal from the input sensor into a character the physical input signal translated at least in part based on the state information for the one or more services received from the remote device, the one or more services including at least one of character completion, auto-correct or input prediction;

generate an insertion text event associated with the character, the insertion text event associated with an event system of the remote device; and transmit the insertion text event from the electronic device to the remote device.

9. The non-transitory machine-readable medium as in claim 8, the input sensor comprising at least one of a touch sensor, an optical sensor, or a contact intensity sensor.

10. The non-transitory machine-readable medium as in claim 8, further comprising instructions which, when executed by one or more processors of the electronic device, configure the one or more processors to:

generate an input event associated with the character, the input event associated with the event system of the electronic device, and distribute the input event via the event system to one or more components of the electronic device, wherein the electronic device and the remote device include a keyboard stack having parallel components.

11. The non-transitory machine-readable medium as in claim 10, further comprising instructions which, when executed by one or more processors of the electronic device, configure the one or more processors to:

configure display of one or more elements of a keyboard presented on the electronic device based on the state information received from the remote device, wherein the state information includes an active set of views in a view hierarchy on the remote device and the insertion text event is generated based on the active set of views.

12. The non-transitory machine-readable medium as in claim 8, further comprising instructions which, when executed by one or more processors of the electronic device, configure the one or more processors to:

establish a communication connection with the remote device in response to a message received from the remote device.

13. The non-transitory machine-readable medium as in claim 12, further comprising instructions which, when executed by one or more processors of the electronic device, configure the one or more processors to advertise a remote input service, wherein the message received from the remote device includes a request to access the remote input service.

14. The non-transitory machine-readable medium as in claim 8, further comprising instructions which, when executed by one or more processors of the electronic device, configure the one or more processors to determine an input method associated with the character, the input method to generate insertion text associated with the insertion text event.

15. An electronic device, comprising:
a non-transitory machine-readable medium to store instructions;
one or more processors to execute the instructions;
a memory coupled to the one or more processors, the memory to store instructions which, when executed by the one or more processors, cause the one or more processors to:
activate a text field on an input device;
detect a host device having support for a remote input service;
gather state information relating to one or more services available through the text field, the state information indicating a context of a document being processed at the text field, the one or more services including at least one of character completion, auto-correct or input prediction;
transmit the state information relating to the one or more services available through the text field to the host device;
receive an input operation from the host device, wherein the input operation is an insertion text event associated with an event system of the electronic device; and
apply the input operation to the text field.

16. The electronic device as in claim 15, further comprising a communication interface to establish a communication connection with the host device.

17. The electronic device as in claim 15, the memory further to store instructions which, when executed by the one or more processors, cause the one or more processors to:
update the state information associated with the text field after application of the input operation to the text field wherein the state information includes an active set of views in a view hierarchy on the electronic device and the insertion text event is generated based on the active set of views.

18. A non-transitory machine-readable medium storing instructions which, when executed by one or more processors of an electronic device, configure the one or more processors to:
activate a text field on an input device;
detect a host device having support for a remote input service;
gather state information relating to one or more services available through the text field, the state information indicating a context of a document being processed at the text field, the one or more services including at least one of character completion, auto-correct or input prediction;
transmit the state information relating to the one or more services available through the text field to the host device;
receive an input operation from the host device, wherein the input operation is an insertion text event associated with an event system of the electronic device; and
apply the input operation to the text field.

19. The non-transitory machine-readable medium as in claim 18, further comprising instructions which, when executed by one or more processors of the electronic device, configure the one or more processors to establish a communication connection with the host device.

20. The non-transitory machine-readable medium as in claim 19, further comprising instructions which, when executed by one or more processors of the electronic device, configure the one or more processors to update the state information associated with the text field after application of the input operation to the text field, wherein the state information includes an active set of views in a view hierarchy on the electronic device and the insertion text event is generated based on the active set of views.

* * * * *